(12) United States Patent
Zhang et al.

(10) Patent No.: US 12,132,593 B2
(45) Date of Patent: Oct. 29, 2024

(54) METHOD AND DEVICE FOR TRANSMITTING MEASUREMENT REFERENCE SIGNAL

(71) Applicant: XI'AN ZHONGXING NEW SOFTWARE CO., LTD., Shaanxi (CN)

(72) Inventors: Shujuan Zhang, Guangdong (CN); Zhaohua Lu, Guangdong (CN); Chuangxin Jiang, Guangdong (CN); Yuxin Wang, Guangdong (CN); Ke Yao, Guangdong (CN)

(73) Assignee: XI'AN ZHONGXING NEW SOFTWARE CO., LTD., Xi'an (CN)

( * ) Notice: Subject to any disclaimer, the term of this patent is extended or adjusted under 35 U.S.C. 154(b) by 0 days.

(21) Appl. No.: 18/386,993

(22) Filed: Nov. 3, 2023

(65) Prior Publication Data
US 2024/0179038 A1    May 30, 2024

Related U.S. Application Data

(63) Continuation of application No. 17/724,867, filed on Apr. 20, 2022, now Pat. No. 11,831,482, which is a
(Continued)

(30) Foreign Application Priority Data

Dec. 29, 2017  (CN) .......................... 201711480010.X
Jan. 12, 2018  (CN) .......................... 201810032050.6

(51) Int. Cl.
*H04L 27/26* (2006.01)
*H04L 5/00* (2006.01)

(52) U.S. Cl.
CPC .......... *H04L 27/2613* (2013.01); *H04L 5/001* (2013.01); *H04L 5/0048* (2013.01); *H04L 5/0057* (2013.01)

(58) Field of Classification Search
CPC .................................................. H04L 27/2613
See application file for complete search history.

(56) References Cited

U.S. PATENT DOCUMENTS 9,497,734 B2  11/2016  Noh et al.
9,980,283 B2   5/2018  Li et al.
(Continued)

FOREIGN PATENT DOCUMENTS

CA     2786700 A1    7/2011
CN   101540631 A     9/2009
(Continued)

OTHER PUBLICATIONS

Japanese notice of allowance issued in JP Patent Application No. 2022-086060, dated Mar. 19, 2024, 3 pages. English translation included.
(Continued)

*Primary Examiner* — Kevin C. Harper
(74) *Attorney, Agent, or Firm* — Perkins Coie LLP

(57) ABSTRACT

Disclosed are a method for sending and receiving signaling information. The method includes: sending, by a base station, signaling information; where the signaling information includes: information about a correspondence between a sequence parameter and a time domain symbol. The correspondence between the sequence parameter and the time domain symbol includes: the sequence parameter hopping once every R3 time domain symbols; where R3 is an integer, each of the R3 time domain symbols includes an uplink channel or an uplink signal. R3 satisfies at least one of the following: R3 is equal to a length of a time domain orthogonal cover code (OCC) corresponding to the uplink channel or the uplink signal, or R3 is equal to a frequency domain repeated sending parameter R; where R is a positive integer.

16 Claims, 8 Drawing Sheets

Determine code domain information corresponding to a measurement reference signal — 410

Send the measurement reference signal using the determined code domain information — 420

Related U.S. Application Data continuation of application No. 16/958,864, filed as application No. PCT/CN2018/125527 on Dec. 29, 2018, now Pat. No. 11,343,128.

(56) References Cited

U.S. PATENT DOCUMENTS

| | | | |
|---|---|---|---|
| 10,819,486 | B2 | 10/2020 | Yang et al. |
| 10,819,546 | B2 | 10/2020 | Liu et al. |
| 11,343,128 | B2 | 5/2022 | Zhang et al. |
| 2009/0046645 | A1 | 2/2009 | Bertrand et al. |
| 2012/0281555 | A1* | 11/2012 | Gao ............... H04L 5/0035 370/252 |
| 2013/0121266 | A1 | 5/2013 | Ko et al. |
| 2014/0078972 | A1 | 3/2014 | Sorrentino |
| 2014/0169204 | A1 | 6/2014 | Cheng et al. |
| 2015/0124673 | A1 | 5/2015 | Ouchi et al. |
| 2016/0295575 | A1* | 10/2016 | Dinan ............... H04W 52/146 |
| 2019/0158334 | A1 | 5/2019 | Kim et al. |

FOREIGN PATENT DOCUMENTS

| | | |
|---|---|---|
| CN | 102404854 A | 4/2012 |
| CN | 102437986 A | 5/2012 |
| CN | 103107866 A | 5/2013 |
| CN | 103326977 A | 9/2013 |
| CN | 104283582 A | 1/2015 |
| CN | 104601286 A | 5/2015 |
| CN | 105827295 A | 8/2016 |
| CN | 106411465 A | 2/2017 |
| CN | 106685872 A | 5/2017 |
| CN | 107294686 A | 10/2017 |
| CN | 107370590 A | 11/2017 |
| EP | 2187678 A1 | 5/2010 |
| IN | 103095442 A | 5/2013 |
| JP | 2009089190 A | 4/2009 |
| JP | 2013179407 A | 9/2013 |
| JP | 2014-527354 A | 10/2014 |
| JP | 2020504949 A | 2/2020 |
| WO | 2014110714 A1 | 7/2014 |
| WO | 2016120461 A1 | 8/2016 |
| WO | 20170213461 A1 | 12/2017 |

OTHER PUBLICATIONS

Mediatek Inc. et al. "Clarification on PUSCH and SRS Transmission in UpPTS" 3GPP TSG-RAN WG1 Meeting #90bis, R1-1717243. Oct. 13, 2017.
Zte et al. "Discussion on SRS Design for NR." 3GPP TSG RAN WG1 Meeting 90bis, R1-1717435. Oct. 13, 2017.
Zte et al. "Remaining Details on DL DMRS and UL DMRS." 3GPP TSG RAN WG1 Meeting 91, R1-1719542. Oct. 1, 2017.
International Search Report for the International Patent Application No. PCT/CN2018/125527, mailed Mar. 29, 2019, 3 pages.
Qualcomm,"LS on NR Beam Management" 3GPP TSG-RAN1 NR Ad-Hoc#2, Quingdao, China, Jun. 27-30, 2017, R1-1712007, 3 pages.
Office Action for the Chinese Patent Application No. 2018100320506, mailed May 19, 2021, 12 pages.
Search Report for the Chinese Patent Application No. 2018100320506, mailed May 19, 2021, 3 pages.
Extended European Search Report for EP Application No. 18896836.6, dated Aug. 20, 2021, 11 pages.
Intel Corporation, 3GPP TSG RAN WG1 Meeting 91, R1-1720075 Remaining details on CSI-RS agenda document, Reno, USA, Nov. 27-Dec. 1, 2017, 11 pages.
Nokia, et al., "UL SRS design considerations in NR AH#2", 3GPP draft for R1-1711310, Qingdao, P.R. China [online] [retrieved on Jun. 26, 2017]. Retrieved from Internet URL: http://www.3gpp.org/ftp/Meetings_3GPP SYNC/RAN1/Docs/, 6 pages.
Nokia, et al., "Remaining details for CSI reporting on PUCCH", 3GPP TSG RAN WG1 Meeting Draft R1-1800744 [online] Jan. 22-26, 2018 Vancouver, CA [retrieved on Jan. 13, 2018]. Retrieved from Internet URL: http://www.3gpp.org/ftp/tsg%5Fran/WG1%5FRL1/TSGR1%5FAH/NR%5FAH%5F1801/Docs/, 5 pages.
Office Action for Japanese Patent Application No. 2020-536674, dated Sep. 28, 2021, original and translated document, 7 pages.
3GPP TS 38.211 V1 .3.0 (Feb. 2017) Technical Specification—3rd Generation Partnership Project; Technical Specification Group Radio Access Network; NR; Physical channels and modulation (Release 15).
Huawei, HiSilicon., "Remaining details of SRS design" 3GPP TSG RAN WG1 Meeting #91, Reno, USA, Nov. 27-Dec. 1, 2017—R1-1719441, 12 pages.
Office Action for the Korean Application No. 10-2020-7022059, dated Mar. 4, 2022, 10 pages.
Ericsson, "Remaining details on SRS design," 3GPP TSG RAN WG1 Meeting 91, R1-1721384, Reno, USA, Nov. 27-Dec. 1, 2017, 10 pages.
Qualcomm Incorporated, "Remaining issues on DMRS design," 3GPP TSG RAN WG1 Meeting 91, R1-1721432, Reno, USA, Nov. 27-Dec. 1, 2017, 29 pages.
Sony, "Summary of SRS," 3GPP TSG RAN WG1 Meeting 91, R1-1721683, Reno, USA, Nov. 27-Dec. 1, 2017, 25 pages.
Qualcomm, "Final Issues for Rel-15 PDSCH/PUSCH's DM-RS," 3GPP TSG RAN WG1 Meeting 91, R1-1721686, Reno, USA, Nov. 27-Dec. 1, 2017, 26 pages.
Japanese office action issued in JP Patent Application No. 2022-86060, dated Jun. 7, 2023, 5 pages. English translation included.
European Communication under Rule 71(3) EPC issued in EP Patent Application No. 18896836.6, dated Jul. 4, 2023, 102 pages.
European Communication under Rule 71(3) EPC issued in EP Patent Application No. 18896836.6, dated Nov. 14, 2023, 100 pages.
Japanese office action issued in JP Patent Application No. 2022-86060, dated Dec. 7, 2023, 5 pages. English translation included.
European Search Report issued in EP Patent Application No. 23194606.2, dated Dec. 21, 2023, 6 pages.
Chinese office action issued in CN Patent Application No. 202210450455.8, dated Jul. 7, 2024, 12 pages. English translation included.
Intel Corporation, "Long PUCCH over multiple slots," 3GPP Tsg Ran WG1 Meeting #90, R1-1712581, Prague, P.R. Czechia, Aug. 21-25, 2017, 5 pages.
European Communication under Rule 71(3) EPC issued in EP Patent Application No. 23194606.2, dated Aug. 30, 2024, 96 pages.

* cited by examiner

METHOD AND DEVICE FOR TRANSMITTING MEASUREMENT REFERENCE SIGNAL

CROSS-REFERENCES TO RELATED APPLICATION

This application is a continuation of U.S. patent application Ser. No. 17/724,867, filed Apr. 20, 2022, which is a continuation of U.S. patent application Ser. No. 16/958,864, filed Jun. 29, 2020, now U.S. Pat. No. 11,343,128, issued May 24, 2022, which is a U.S. National Stage Application of International Patent Application No. PCT/CN2018/125527, filed Dec. 29, 2018, which claims priority to Chinese Patent Application No. 201711480010.X, filed Dec. 29, 2017, and Chinese Patent Application No. 201810032050.6, filed Jan. 12, 2018, the disclosures of each of which are incorporated herein by reference in their entireties.

TECHNICAL FIELD

The present disclosure relates to the field of communications, for example, to a method and device for transmitting a measurement reference signal.

BACKGROUND

At present, an uplink measurement reference signal plays an important role in communication technology, and is not only used for uplink channel measurement, but also used for downlink channel measurement. Considering future dense cells and large-capacity users, the capacity problem of the uplink measurement reference signal is a problem to be further studied.

Meanwhile, considering that New Radio (NR) is enhanced as follows relative to a Long Term Evolution (LTE) system for an uplink sounding reference signal (SRS): one SRS resource may occupy consecutive {1, 2, 4} time domain symbols in one slot, and based on the above enhancement, the capacity of the SRS may be further enhanced, which is suitable for accessing of a large number of users in the future.

No effective solution has been provided to solve the problem of enhancing the capacity or coverage of a measurement reference signal in the new radio in the existing art.

SUMMARY

The present disclosure provides a method and device for sending and receiving signaling information, to at least solve the problem of the lack of a solution for determining a measurement reference signal in NR in the related art.

In on embodiment, the present disclosure provides a method for sending signaling information. The method includes a step described below.

Signaling information is sent.

In the method, the signaling information includes: information about a correspondence between a sequence parameter and a time domain symbol; where the sequence parameter comprises at least one of the following corresponding to a sequence on an uplink channel or an uplink signal: a sequence group number or a sequence number.

The correspondence between the sequence parameter and the time domain symbol includes: the sequence parameter hopping once every R3 time domain symbols; where R3 is an integer, each of the R3 time domain symbols includes the uplink channel or the uplink signal.

R3 satisfies at least one of the following: R3 is equal to a length of a time domain orthogonal cover code (OCC) corresponding to the uplink channel or the uplink signal, or R3 is equal to a frequency domain repeated sending parameter R; wherein R is a positive integer.

In one embodiment, the present disclosure further provides a method for receiving signaling information. The method includes: receiving signaling information; and determining the following according to the signaling information: information about a correspondence between a sequence and a time domain symbol, where the sequence parameter comprises at least one of the following corresponding to a sequence on an uplink channel or an uplink signal: a sequence group number or a sequence number.

The correspondence between the sequence parameter and the time domain symbol includes: the sequence parameter hopping once every R3 time domain symbols: where R3 is an integer, each of the R3 time domain symbols includes the uplink channel or the uplink signal.

R3 satisfies at least one of the following: R3 is equal to a length of a time domain orthogonal cover code (OCC) corresponding to the uplink channel or the uplink signal, or R3 is equal to a frequency domain repeated sending parameter R; wherein R is a positive integer.

In one embodiment, the present disclosure further provides a device for sending signaling information. The device includes a processor; and a memory for storing instructions executable by the processor. The processor is configured to send signaling information, where the signaling information includes: information about a correspondence between a sequence parameter and a time domain symbol, where the sequence parameter comprises at least one of the following corresponding to a sequence on an uplink channel or an uplink signal: a sequence group number or a sequence number.

The correspondence between the sequence parameter and the time domain symbol includes: the sequence parameter hopping once every R3 time domain symbols; where R3 is an integer, each of the R3 time domain symbols includes the uplink channel or the uplink signal.

R3 satisfies at least one of the following: R3 is equal to a length of a time domain orthogonal cover code (OCC) corresponding to the uplink channel or the uplink signal, or R3 is equal to a frequency domain repeated sending parameter R; wherein R is a positive integer.

DETAILED DESCRIPTION

The present disclosure will be described hereinafter in detail with reference to the drawings and in conjunction with embodiments. If not in collision, the embodiments described herein and the features thereof may be combined with each other.

The terms "first", "second" and the like in the specification, claims and above drawings of the present disclosure are used to distinguish between similar objects and are not necessarily used to describe a particular order or sequence.

EMBODIMENT ONE

An embodiment of the present application provides a mobile communication network (which includes, but is not limited to, a 5th generation (5G) mobile communication network). The network architecture of this network may include a network side device (such as a base station) and a terminal. An information transmission method executed on the above network architecture is provided by the embodiment. The execution environment of the information transmission method provided by the embodiment of the present application is not limited to the above network architecture.

Figure 1:
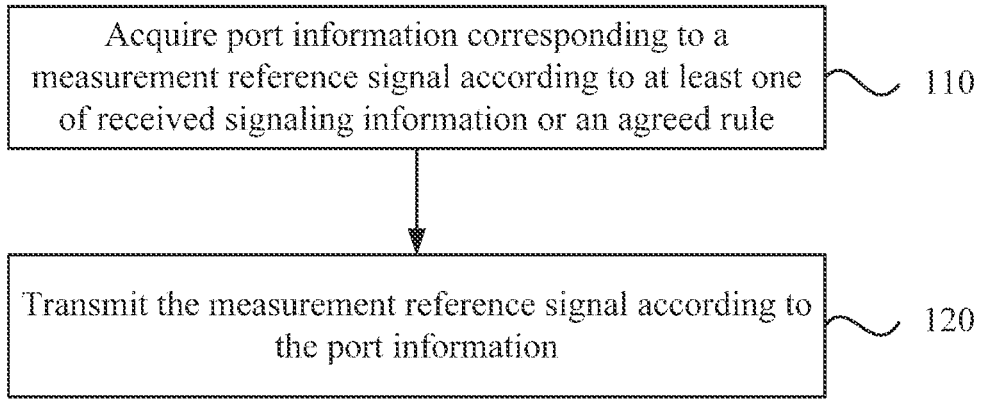
FIG. 1 is a flowchart of a method for transmitting a measurement reference signal according to an embodiment of the present disclosure.

The embodiment provides a method for transmitting a measurement reference signal executable on the network architecture described above. As shown in FIG. 1, the method includes steps 110 and 120.

In step 110, port information corresponding to a measurement reference signal is acquired according to at least one of received signaling information or an agreed rule. In one embodiment, in a case where the measurement reference signal is an uplink measurement reference signal, the measurement reference signal may also be referred to as a sounding reference signal, i.e., SRS. The solution of step 110 described above may include: acquiring the port information according to the received signaling information, or acquiring the port information corresponding to the measurement reference signal according to the agreed rule, or acquiring the port information according to the received signaling information and the agreed rule. The measurement reference signal is one of various types of reference signals, and may be used for channel estimation or channel sounding.

In one embodiment, the agreed rule may be understood as a predetermined rule.

In step 120, the measurement reference signal is transmitted according to the port information, where the port information includes at least one of the following: a time domain OCC index corresponding to the measurement reference signal, a length of a time domain OCC corresponding to the measurement reference signal, or a port index of the measurement reference signal. In one embodiment, the transmitting described above includes sending or receiving.

Through the above steps, port information corresponding to a measurement reference signal is acquired according to received signaling information and/or an agreed rule, and the measurement reference signal is transmitted according to the port information, where the port information includes at least one of the following: a time domain OCC index corresponding to the measurement reference signal, a length of a time domain OCC corresponding to the measurement reference signal, or a port index of the measurement reference signal. Through the solution described above, the measurement reference signal resource can adopt the time domain OCC so that the coverage of the measurement reference signal is not affected while the capacity of the measurement reference signal is increased. The problem of the lack of technology of increasing the capacity or coverage of one measurement reference signal in NR in the related art is solved, further solving the problem of the capacity of the measurement reference signal (such as an uplink measurement reference signal) and the problem of orthogonalization of measurement reference signals partially overlapping in frequency domain.

In one embodiment, the above steps may, but are not limited to, be executed by a base station, a terminal or the like.

In one embodiment, execution sequences of step 110 and step 120 are interchangeable.

In one embodiment, the port information includes at least one of the following features: port indexes of different measurement reference signals correspond to different time domain OCCs; measurement reference signal ports included in one measurement reference signal resource share one time domain OCC; one measurement reference signal resource corresponds to one time domain OCC; or port indexes of measurement reference signals corresponding to two measurement reference signal resources including the same number of ports are different.

In one embodiment, the step of acquiring the port information corresponding to the measurement reference signal according to the agreed rule includes at least one of the following: acquiring the port information according to an identifier (ID) of a measurement reference signal resource in which the measurement reference signal is located; acquiring the port information according to an ID of a measurement reference signal resource set in which the measurement reference signal is located; acquiring the port information according to configuration information of the measurement reference signal resource set in which the measurement reference signal is located; acquiring the port information according to identification information of a communication node transmitting measurement reference information (for example, in response to the communication node being a terminal, the identification information of the terminal may be a cell-radio network temporary identifier (C-RNTI)); or acquiring the port information according to a parameter generating a demodulation reference signal; where the measurement reference signal resource set includes at least one measurement reference signal resource, and one measurement reference signal resource includes at least one measurement reference signal port.

In one embodiment, the step of acquiring the port information corresponding to the measurement reference signal according to the agreed rule includes: acquiring the port information corresponding to the measurement reference signal according to at least one of pieces of the following information:
  the number N of time domain symbols included in a time unit in which the measurement reference signal is located; a positive integer M; the number L of time domain symbols occupied by the measurement reference signal in one time unit; index information $l_2$ of a time domain symbol, in which the measurement reference signal is located, in N time domain symbols included in one time unit; index information $l_1$ of a time domain symbol, in which the measurement reference signal is located, in M preset time domain symbols; index information $l_0$ of the measurement reference signal in the L time domain symbols; a frame number of a frame in which the measurement reference signal is located; the number B of time units included in the frame in which the measurement reference signal is located; a time unit index acquired according to a subcarrier spacing of a bandwidth part (BWP) in which the measurement reference signal is located; a random sequence with a length of D; a virtual cell number $n_{ID}^{SRS}$; a frequency domain repeated sending parameter R corresponding to the measurement reference signal; or a sequence repetition parameter R5 corresponding to the measurement reference signal; where B, D, L, N, M and L are positive integers.

M satisfies the following condition: M is less than or equal to N and is greater than or equal to A, where A is the maximum number of time domain symbols allowed to be occupied by the measurement reference signal in one time unit, or A is the number of time domain symbols occupied by the measurement reference signal in one time unit.

The frequency domain repeated sending parameter R represents that the measurement reference signal hops once in frequency domain every R time domain symbols; the sequence repetition parameter R5 represents that the measurement reference signal hops once in sequence or sequence parameter every R5 time domain symbols; and the R time domain symbols or the R5 time domain symbols include the measurement reference signal; where both R and R5 are positive integers.

In one embodiment, the index information $l_i$, i=1, 2 may be obtained through the following formula: $l_i = l_i^{start} + l'$, where $l_2^{start}$ is index information of a starting time domain symbol, occupied by the measurement reference signal in a time unit, in the time unit, $l_1^{start}$ is index information of the starting time domain symbol occupied by the measurement reference symbol in the preset M time domain symbols, and l'=0, 1, . . . , L−1 is index information of the time domain symbol occupied by the measurement reference signal in the L time domain symbols.

In one embodiment, the step of acquiring the port information corresponding to the measurement reference signal according to the received signaling information includes at least one of the following: including the port index of the measurement reference signal in the received signaling information; including the time domain OCC index corresponding to the measurement reference signal in the received signaling information; including the length of the time domain OCC corresponding to the measurement reference signal in the received signaling information; or including the port information of the measurement reference signal in the configuration information of the measurement reference signal resource set in which the measurement reference signal is located.

In one embodiment, the length of the time domain OCC includes at least one of the following:
  the length of the time domain OCC corresponding to the measurement reference signal is less than or equal to the frequency domain repeated sending parameter R corresponding to the measurement reference signal;
  the length of the time domain OCC corresponding to the measurement reference signal is less than or equal to the sequence repetition parameter R5 corresponding to the measurement reference signal;
  the length of the time domain OCC includes a length 1;
  the length of the time domain OCC has an association with a sequence parameter (in one embodiment, the sequence parameter is used for generating the sequence, and for example, the sequence parameter includes at least one of parameters: a sequence group number, a sequence number, and a cyclic shift) of the measurement reference signal (in one embodiment, having an association between the time domain OCC and the sequence parameter may refer to acquiring the latter according to the former, and may also refer to acquiring the former according to the latter);
  the length of the time domain OCC has an association with the number of time domain symbols included in a sequence hopping unit of the measurement reference signal; or the length of the time domain OCC has an association with a first relationship, where the first relationship is a relationship between a sequence and a time domain symbol of the measurement reference signal;

where the frequency domain repeated sending parameter R represents that the measurement reference signal hops once in frequency domain every R time domain symbols; the sequence repetition parameter R5 represents that the measurement reference signal hops once in sequence or sequence parameter every R5 time domain symbols; and the R time domain symbols or the R5 time domain symbols include the measurement reference signal;

where both R and R5 are positive integers.

In one embodiment, the length of the time domain OCC has the association with the sequence parameter of the measurement reference signal, and the association includes at least one of the following:

in a case where the length of the time domain OCC is greater than 1, sequences corresponding to one measurement reference signal port on R1 time domain symbols are the same;

in a case where the length of the time domain OCC is greater than 1, one measurement reference signal port corresponds to the same sequence group number on R1 time domain symbols;

in a case where the length of the time domain OCC is greater than 1, one measurement reference signal port corresponds to the same sequence number on R1 time domain symbols;

in a case where sequences corresponding to one measurement reference signal port on R1 time domain symbols are different, a length of a time domain OCC corresponding to the measurement reference signal port is 1; or in a case where sequence parameters corresponding to one measurement reference signal port on R1 time domain symbols are different, the length of the time domain OCC corresponding to the measurement reference signal port is 1;

where R1 at least satisfies one of the following features: R1 is less than or equal to R, R1 is the length of the time domain OCC, or R1 is less than or equal to N; and R1 time domain symbols include the measurement reference signal;

where N is the number of time domain symbols included by the one measurement reference signal port in one time unit, and both R1 and N are positive integers.

In one embodiment, a time domain OCC set has an association with a sequence of the measurement reference signal.

In one embodiment, the association between the time domain OCC set and the sequence of the measurement reference signal includes at least one of the following: different time domain OCC sets correspond to different sequence generation modes of the measurement reference signal, and/or different sequence generation modes of the measurement reference signal correspond to different time domain OCC sets; where the sequence generation mode corresponding to the measurement reference signal includes at least one of the following: sequences corresponding to one measurement reference signal port on R1 time domain symbols are the same; sequences corresponding to one measurement reference signal port on R1 time domain symbols are different; sequence parameters corresponding to one measurement reference signal port on R1 time domain symbols are the same; sequence parameters corresponding to one measurement reference signal port on R1 time domain symbols are different; symbols corresponding to the measurement reference signal on time domain symbols corresponding to time domain OCC codes on a same sub-carrier are the same; or symbols corresponding to the measurement reference signal on time domain symbols corresponding to time domain OCC codes on a same sub-carrier are different.

The sequence parameter is used for generating the sequence, and for example, the sequence parameter includes at least one of the following parameters: a sequence group number, a sequence number, or a cyclic shift; where R1 is a positive integer, and at least satisfies one of the following features: R1 is less than or equal to R, R1 is the length of the time domain OCC, and R1 is less than or equal to N; or R1 time domain symbols include the measurement reference signal.

N is the number of time domain symbols included by the one measurement reference signal port in one time unit; and R is a frequency domain repeated sending parameter and represents that the measurement reference signal hops once in frequency domain every R time domain symbols, and each of the R time domain symbols includes the measurement reference signal, where R is a positive integer. In one embodiment, the measurement reference signal hops once in frequency domain every R time domain symbols, but each of the R time domain symbols is a time domain symbol including a measurement reference signal. For example, each of time domain symbols with indexes 1, 5, 7 and 12 includes the measurement reference signal. It is assumed that the measurement reference signal hops once in frequency domain every three time domain symbols, then the measurement reference signal hops once in frequency domain after the time domain symbols 1, 5 and 7, instead of after time domain symbols 1, 2, and 3. That is, time domain symbols which do not include the measurement reference signal are not counted in the R time domain symbols.

In one embodiment, the step of transmitting the measurement reference signal according to the port information includes at least one of the following: at least one of a phase tracking reference signal (PTRS) or the measurement reference signal is not allowed to be transmitted in the following case:

the length of the time domain OCC corresponding to the measurement reference signal is greater than 1, or the time domain OCC corresponding to the measurement reference signal does not belong to a predetermined time domain OCC set, or the measurement reference signal corresponds to at least two different time domain OCCs.

The following two have an association: the length of the time domain OCC of the measurement reference signal, and whether to send the PTRS.

The following two have an association: whether the time domain OCC of the measurement reference signal is enabled, and whether the PTRS exists.

The following two have an association: the time domain OCC set of the measurement reference signal, and whether the PTRS exists.

Figure 2:
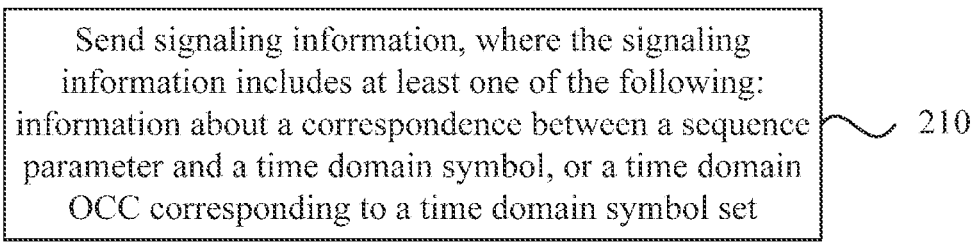
FIG. 2 is a flowchart of a method for sending signaling information according to an embodiment of the present disclosure.

According to another embodiment of the present disclosure, a method for sending signaling information is provided. As shown in FIG. 2, the method includes step 210.

In step 210, signaling information is sent, where the signaling information includes at least one of the following: information about a correspondence between a sequence parameter and a time domain symbol, or a time domain OCC corresponding to a time domain symbol set, which may also be referred to as a phase scrambling factor corresponding to the time domain symbol in the time domain symbol set.

In the solution described above, the signaling information is sent, where the signaling information includes at least one of the following: information about a correspondence between a sequence and a time domain symbol, and a time domain OCC corresponding to a time domain symbol set, or the measurement reference signal is determined according to the signaling information. Such solution allows the measurement reference signal resource to adopt the time domain OCC so that the coverage of the measurement reference signal is not affected while the capacity of the measurement reference signal is increased, thereby solving the problem of the capacity of the measurement reference signal (such as an uplink measurement reference signal) and the problem of orthogonalization of measurement reference signals partially overlapping in frequency domain. The present disclosure also solves the problem of the capacity of the demodulation reference signal, such as an uplink demodulation reference signal, and the problem of orthogonalization of demodulation reference signals partially overlapping in frequency domain. Meanwhile, the present disclosure also solves the problem of how to implement orthogonality between different channels or signals through the time domain OCC.

In one embodiment, the information about the correspondence between the sequence parameter and the time domain symbol includes at least one of the following: information about whether the sequence parameter changes on R2 time domain symbols; information about whether the sequence changes on R2 time domain symbols; the sequence hopping once every R3 time domain symbols; or the sequence parameter hopping once every R3 time domain symbols; where the sequence hopping once every R3 time domain symbols represents that all sequence parameters used for generating the sequence maintain unchanged in the R3 time domain symbols, where both R2 and R3 are positive integers.

In one embodiment, the sequence parameter is used for generating the sequence. For example, the sequence parameter includes at least one of the following parameters: a sequence group number, a sequence number, and a cyclic shift. For example, if the sequence group number hops once every four time domain symbols, and the sequence number and the cyclic shift hop once every two time domain symbols, the sequence hops once every two time domain symbols. Of course, the number of time domain symbols included in time domain hopping units of all sequence parameters may also be the same. The sequence parameter is used for generating the sequence, and for example, includes a sequence group number and/or a sequence number. The R2 time domain symbols include the channels or signals, the R3 time domain symbols include the channels or signals. Alternatively, time domain symbols that do not include the channels or signals may exist in the R2 time domain symbols, and time domain symbols that do not include the channels or signals may exist in the R3 time domain symbols. The sequence is a sequence of a symbol to be transmitted on the channel or signal before being multiplied by the time domain OCC. The symbol may be a modulation symbol or a reference signal symbol. The channel includes a data channel and/or a control channel, and the signal includes a reference signal, including, for example, a demodulation reference signal, a measurement reference signal, a synchronizing signal and a phase tracking reference signal.

In one embodiment, R2 or R3 includes at least one of the following (in one embodiment, R2 and R3 may simultaneously include at least one of the following): R2 or R3 is less than or equal to a frequency domain repeated sending parameter R; R2 or R3 is less than or equal to a length of a time domain OCC corresponding to a channel or a signal; R2 or R3 is less than or equal to N, where N is the number of time domain symbols included by a channel or a signal in one time unit, and the channel or the signal is a channel or a signal corresponding to the signaling information; where each of the R2 time domain symbols includes the channel or the signal; or each of the R3 time domain symbols includes the channel or the signal.

The frequency domain repeated sending parameter R represents that the measurement reference signal hops once in frequency domain every R time domain symbols, and each of the R time domain symbols includes the measurement reference signal, where R is a positive integer.

In one embodiment, the sequence is transmitted (sent or received) in at least one of the following: a control channel, a data channel, a measurement reference signal, or a demodulation reference signal.

In one embodiment, in a case where the signaling information includes a time domain OCC corresponding to a time domain symbol set, the method further includes:

transmitting, on a channel or a signal corresponding to the signaling information, a symbol transmitted on a time domain symbol in the time domain symbol set after the symbol is multiplied by the time domain OCC, or in response to same symbols transmitted on multiple time domain symbols in the time domain symbol set (in one embodiment, the symbols are information to be transmitted before being multiplied by the time domain OCC on the channel or the signal), transmitting the symbols on a channel or a signal corresponding to the signaling information after the symbols are multiplied by the time domain OCC.

Figure 3:
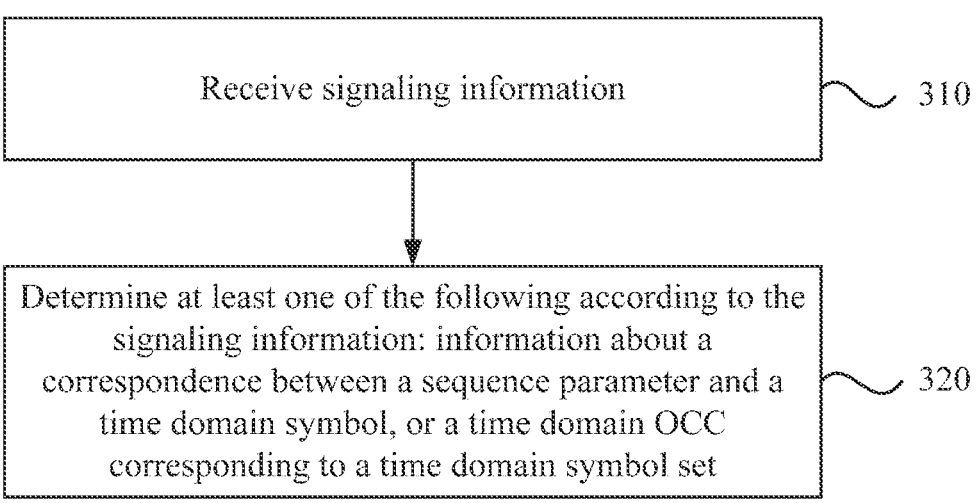
FIG. 3 is a flowchart of a method for receiving signaling information according to an embodiment of the present disclosure.

According to another embodiment of the present disclosure, a method for receiving signaling information is provided. As shown in FIG. 3, the method includes steps 310 and 320.

In step 310, signaling information is received.

In step 320, at least one of the following is determined according to the signaling information: information about a correspondence between a sequence parameter and a time domain symbol, or a time domain OCC corresponding to a time domain symbol set.

Through the above-described solution in which information about the measurement reference signal is determined according to the signaling information, the measurement reference signal can adopt the time domain OCC so that the coverage of the measurement reference signal is not affected while the capacity of the measurement reference signal is increased. The problem of the lack of technology of increasing the capacity or coverage of a measurement reference signal in NR in the related art is solved, and the problem of the capacity of the measurement reference signal (such as an uplink measurement reference signal) and the problem of orthogonalization of measurement reference signals partially overlapping in frequency domain are solved. The present disclosure also solves the problem of the capacity of the demodulation reference signal (such as an uplink demodulation reference signal) and the problem of orthogonalization of demodulation reference signals partially overlapping in frequency domain. Meanwhile the present disclosure also solves the problem of how to implement orthogonality between different channels or signals through the time domain OCC.

In one embodiment, the information about the correspondence between the sequence and the time domain symbol includes at least one of the following: information about whether the sequence parameter changes on R2 time domain symbols in one time unit; information about whether the sequence changes on R2 time domain symbols in one time unit; the sequence hopping once after every R3 time domain symbols; or the sequence parameter hopping once after every R3 time domain symbols; where R2 and R3 are positive integers, and the sequence parameter includes at least one of the following parameters: a sequence group number or a sequence number.

In one embodiment, R2 and/or R3 satisfy at least one of the following features: R2 and/or R3 are less than or equal to R, R2 and/or R3 are less than or equal to a length of a time domain OCC corresponding to a channel or a signal, and R2 and/or R3 are less than or equal to N, where N is the number of time domain symbols included by the channel or the signal in one time unit, and the channel or the signal is a channel or a signal corresponding to the signaling information, where R is a frequency domain repeated sending parameter and represents that the measurement reference signal hops once every R time domain symbols in frequency domain, and the R time domain symbols include the measurement reference signal, where R and N are positive integers.

In one embodiment, the sequence is transmitted in at least one of the following: a control channel, a data channel, a measurement reference signal, or a demodulation reference signal.

In one embodiment, in a case where the signaling information includes the time domain OCC corresponding to the time domain symbol set, one of the following features is satisfied: a symbol transmitted on a time domain in the time domain symbol set is transmitted on the channel or the signal corresponding to the signaling information after the symbol is multiplied by the time domain OCC, and in response to same symbols transmitted on multiple time domain symbols in the time domain symbol set, the symbols are transmitted on the channel or the signal corresponding to the signaling information after the symbols are multiplied by the time domain OCC.

Figure 4:
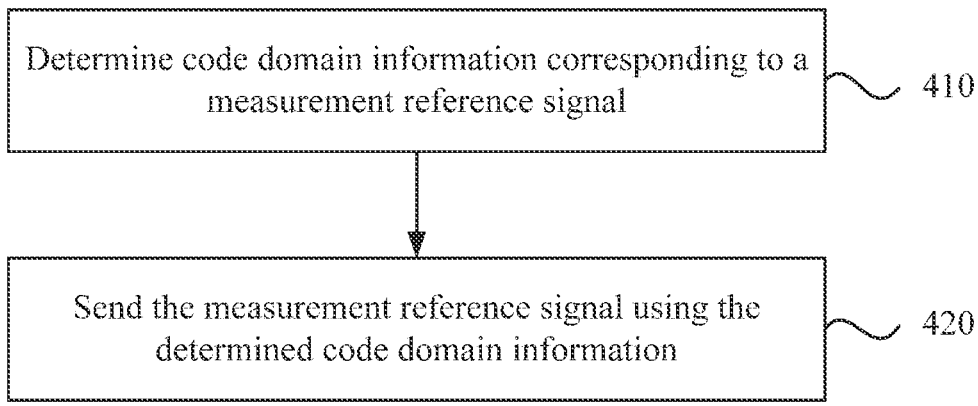
FIG. 4 is a flowchart of another method for transmitting a measurement reference signal according to an embodiment of the present disclosure.

According to another embodiment of the present disclosure, a method for transmitting a measurement reference signal is further provided. As shown in FIG. 4, the method includes steps 410 and 420.

In step 410, code domain information corresponding to a measurement reference signal is determined.

In step 420, the measurement reference signal is sent using the determined code domain information.

The code domain information includes at least one of the following: a time domain OCC index, a sequence parameter, or a port index.

The sequence parameter is used for generating a sequence, and the code domain information hops once every F time domain symbols, where F is a positive integer.

Through the above solution, the code domain information of the measurement reference signal has a hopping unit, which can reduce the inter-cell interference of the measurement reference signal, increases the capacity and coverage of the measurement reference signal to some extent, and reduces the signaling overhead. Meanwhile, the sequence parameter has a hopping unit so that the time domain OCC can be applied to the measurement reference signal. Therefore, the problem of lack of the technology of increasing the capacity or coverage of the measurement reference signal in the NR in the related art is solved.

In one embodiment, the step of determining the code domain information corresponding to the measurement reference signal includes: acquiring the code domain information of the measurement reference signal according to first information, where the first information includes at least one of the following:

an ID of a measurement reference signal resource in which the measurement reference signal is located; the number N of time domain symbols included in a time unit in which the measurement reference signal is located; a positive integer M; the number L of time domain symbols occupied by the measurement reference signal in one time unit; index information $l_2$ of a time domain symbol, in which the measurement reference signal is located, in N time domain symbols included in one time unit; index information $l_1$ of a time domain symbol, in which the measurement reference signal is located, in M preset time domain symbols; index information $l_0$ of the measurement reference signal in the L time domain symbols; a frame number of a frame in which the measurement reference signal is located; the number B of time units included in the frame in which the measurement reference signal is located; a time unit index acquired according to a subcarrier spacing of a BWP in which the measurement reference signal is located; a random sequence with a length of D; a virtual cell number $n_{ID}^{SRS}$; a frequency domain repeated sending parameter R corresponding to the measurement reference signal; a sequence repetition parameter R5 corresponding to the measurement reference signal; or F; where B, D, L, N, M and L are positive integers.

M satisfies the following condition: M is less than or equal to N and is greater than or equal to A, where A is the maximum number of time domain symbols allowed to be occupied by the measurement reference signal in one time unit, or A is the number of time domain symbols occupied by the measurement reference signal in one time unit.

The frequency domain repeated sending parameter R (the frequency domain resource includes a frequency domain physical resource block (PRB) and/or a frequency domain subcarrier) represents that the measurement reference signal hops once in frequency domain every R time domain symbols; the sequence repetition parameter R5 represents that the measurement reference signal hops once in sequence or sequence parameter every R5 time domain symbols; the R time domain symbols or the R5 time domain symbols include the measurement reference signal; and the F time domain symbols include the measurement reference signal.

Both R and R5 are positive integers.

In one embodiment, the index information $l_i$, i=1, 2 may be obtained through the following formula: $l_i = l_i^{start} + l'$, where $l_2^{start}$ is index information of a starting time domain symbol, occupied by the measurement reference signal in a time unit, in the time unit, $l_1^{start}$ is index information of the starting time domain symbol occupied by the measurement reference symbol in the preset M time domain symbols, and l'=0, 1, . . . , L−1 is index information of the time domain symbol occupied by the measurement reference signal in the L time domain symbols.

In one embodiment, the time domain OCC index or the port index of the measurement reference signal is acquired through one of the following formulas.

$$Portindex = \left(w_0 + \sum_{i=0}^{D_1-1} c(D_1 g(X) + i)2^i\right) \bmod T$$

$$Portindex = \left(w_0 + \sum_{i=0}^{D_1-1} c(D_1 \lfloor g(X)/F \rfloor + i)2^i\right) \bmod T$$

g(X) is a function with respect to X, and X includes the first information.

Portindex represents the port index corresponding to the measurement reference signal, or the time domain OCC index corresponding to the measurement reference signal.

T is one of pieces of the following information: a length of the time domain OCC, the total number of time domain OCCs available to the measurement reference signal, and the total number of port indexes of the measurement reference signal.

c(z) represents a z-th value of a randomized sequence, and z is a positive integer (in one embodiment, c(z) may be a pseudo-noise (PN) sequence).

$w_0 \in \{0, 1, \ldots T-1\}$ is an agreed value, or is obtained according to other parameters in an agreed rule, for example, $w_0 = f(n_{ID}^{SRS})$, where $n_{ID}^{SRS}$ is a physical cell number, or $w_0$ is included in the received signaling information.

$D_1$ is an integer greater than or equal to 1.

F is equal to R, or F is equal to R5, or F is equal to a smaller one of R and R5.

In one embodiment, the sequence parameter corresponding to the measurement reference signal is used for generating the sequence. For example, the sequence parameter includes at least one of the following parameters: a sequence group number, a sequence number, or a cyclic shift.

The cyclic shift $n_{SRS}^{cs,i}$ is acquired through one of the following formulas.

$$n_{SRS}^{cs,i} = \left(n_{SRS}^{cs} + \frac{n_{SRS}^{cs,max} p_i}{N_{ap}^{SRS}} + \sum_{i=0}^{D_2-1} \left(c(D_2 g(X) + i)2^i\right)\right) \bmod n_{SRS}^{cs,max},$$

$$i = 0, 1, \ldots, N_{ap}^{SRS} - 1$$

$$n_{SRS}^{cs,i} = \left(n_{SRS}^{cs} + \frac{n_{SRS}^{cs,max} p_i}{N_{ap}^{SRS}} + \sum_{i=0}^{D_2-1} \left(c(D_2 \lfloor g(X)/F \rfloor + i)2^i\right)\right) \bmod n_{SRS}^{cs,max},$$

$$i = 0, 1, \ldots, N_{ap}^{SRS} - 1$$

The sequence group number u is acquired through one of the following formulas.

$$u = \left(f_{gh}\left(\left(\sum_{i=0}^{D_3-1} c(D_3 g(X) + i)2^i\right)\right) \bmod C + f_{ss}\right) \bmod C$$

$$u = \left(f_{gh}\left(\left(\sum_{i=0}^{D_3-1} c(D_3 \lfloor g(X)/F \rfloor + i)2^i\right)\right) \bmod C + f_{ss}\right) \bmod C$$

The sequence number v is acquired through one of the following formulas.

$$v = c(g(X))$$

$$v = c(\lfloor g(X)/F \rfloor)$$

g(X) is a function with respect to X, and X includes the first information.

$N_{ap}^{SRS}$ is the number of measurement reference signal ports included in one measurement reference signal resource.

$n_{SRS}^{cs,max}$ is an agreed value, or is included in the received signaling information ($n_{SRS}^{cs,max}$ is the total number of cyclic shifts available to the measurement reference signal), and c(z) represents a z-th value of a randomized sequence, where z is a positive integer (in one embodiment, c(z) may be a PN random sequence).

$n_{SRS}^{cs} \in \{0, 1, \ldots n_{SRS}^{cs,max}-1\}$ is a predetermined value, or $n_{SRS}^{cs}$ is included in the received signaling information.

$D_2$ and $D_3$ are integers greater than or equal to 1.

C is the total number of sequence groups.

$f_{ss}$ is acquired according to at least one of the following included parameters: an agreed rule, or received signaling information.

F is equal to R, or F is equal to R5, or F is equal to a smaller one of R and R5.

In one embodiment, the g(X) is one of the following formulas.

$$g(l_1, M, n_s) = l_1 + n_s * M$$

$$g(l_1, M, n_s, n_f) = l_1 + n_s * M + B * n'_f * M$$

$$g(l_2, N, n_s) = l_2 + n_s * N$$

$$g(l_2, N, n_s, n_f) = l_2 + n_s * N + B * n'_f * N$$

$$g(l_0, L, n_s) = l_0 + n_s * L$$

$$g(l_0, N, n_s, n_f) = l_0 + n_s * N + B * n'_f * N$$

$$g(l_1, M, n_s, F) = \lfloor l_1/F \rfloor + n_s * M/F$$

$$g(l_1, M, n_s, n_f, F) = \lfloor l_1/F \rfloor + (n_s * M + B * n'_f * M)/F$$

$$g(l_2, N, n_s, F) = \lfloor l_2/F \rfloor + n_s * N/F$$

$$g(l_2, N, n_s, n_f, r) = \lfloor l_2/r \rfloor + (n_s * N + B * n'_f * N)/r$$

$$g(l_0, L, n_s, F) = \lfloor l_0/r \rfloor + n_s * L/F$$

$$g(l_0, N, n_s, n_f, F) = \lfloor l_0/F \rfloor + (n_s * N + B * n'_f * N)/F$$

$n'_f = n_f$ or $n'_f = n_f \bmod(E)$, $n_f$ is a frame number of a frame in which the reference signal is located, $n_s$ is a time unit index, and E is a predetermined value.

F is equal to R, or F is equal to R5, or F is equal to a smaller one of R and R5.

In one embodiment, one time unit may be a slot or a subframe.

Figure 5:
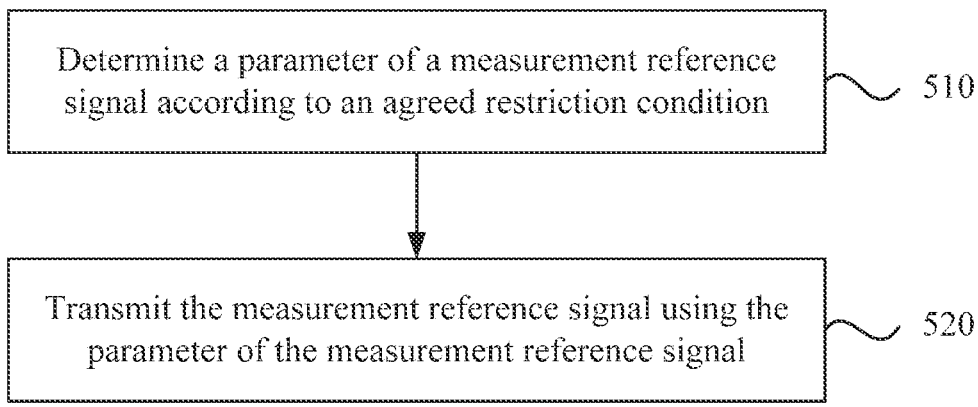
FIG. 5 is a flowchart of still another method for transmitting a measurement reference signal according to an embodiment of the present disclosure.

According to another embodiment of the present disclosure, a method for transmitting a measurement reference signal is further provided. As shown in FIG. 5, the method includes steps 510 and 520.

In step 510, a parameter of a measurement reference signal is determined according to an agreed restriction condition.

In step 520, the measurement reference signal is transmitted using the parameter of the measurement reference signal.

Through the above solution in which the transmission of the measurement reference signal satisfies the agreed condition, or the parameter of the measurement reference signal is determined according to the agreed rule, the signaling overhead is reduced, and the problem of lack of the technology of increasing the capacity or coverage of the measurement reference signal in the NR in the related art is solved.

In one embodiment, the step of determining the parameter of the measurement reference signal according to the agreed restriction condition includes: determining a frequency hopping parameter of the measurement reference signal according to the agreed restriction condition.

In one embodiment, the measurement reference signal is a measurement reference signal triggered by physical layer dynamic signaling, and thus may also be referred to as an aperiodic measurement reference signal.

In one embodiment, the parameter of the measurement reference signal includes a first parameter set and a second parameter set; where the second parameter set is determined according to the first parameter set and the restriction condition.

In one embodiment, the parameter of the measurement reference signal includes at least one of the following:
the first parameter set being included in received signaling information;
the second parameter set being not included in the received signaling information;
the second parameter set including level information of a bandwidth occupied by the measurement reference signal on one time domain symbol;
an intersection set of the first parameter set and the second parameter set being empty; or
at least one of the first parameter set and the second parameter set including one of the following: an index of a multilevel bandwidth structure, level information of a bandwidth occupied by the measurement reference signal on one time domain symbol, frequency hopping bandwidth level information of the measurement reference signal, information about the number of time domain symbols occupied by the measurement reference signal in one time unit, a repeated sending parameter of the measurement reference signal in one time unit, or a sequence repetition parameter of the measurement reference signal.

In one embodiment, the restriction condition includes at least one of the following conditions.

Frequency domain resources occupied by the measurement reference signal in one time unit are consecutive (in one embodiment, being continuous represents that PRBs occupied by the measurement reference signal in a union set of frequency domain resources occupied by the measurement reference signal are consecutive, and no inconsecutive PRBs exist).

Frequency domain subcarriers occupied by the measurement reference signal in one time unit are evenly distributed on the frequency domain resources occupied by the measurement reference signal in one time unit.

Frequency domain resources occupied by the measurement reference signal in one time unit are a frequency hopping bandwidth.

Frequency domain resources occupied by the measurement reference signal in one time unit are a BWP.

Frequency domain resources occupied by the measurement reference signal in one time unit are a maximum bandwidth in the multilevel bandwidth structure.

A frequency hopping bandwidth level of the measurement reference signal is an agreed value.

The parameter of the measurement reference signal satisfies the following formula:

$$\sum_{b \in b_{hopA}} N_b$$

is less than or equal to $$\frac{N_s}{R}.$$

The parameter of the measurement reference signal satisfies the following formula:

$$\sum_{b=b_{hop}+1}^{B_{SRS}} N_b$$

is less than or equal to $$\frac{N_s}{R}.$$

In the formulas mentioned above, b is bandwidth level information in the multilevel bandwidth structure, $b_{hopA}$ is a frequency hopping bandwidth level set, $N_s$ is the number of time domain symbols occupied by the measurement reference signal in one time unit, and R is a frequency domain repeated sending parameter of the measurement reference signal; where the multilevel bandwidth structure includes multiple bandwidth levels, one bandwidth in (b−1)-th level bandwidths includes $N_b$ bandwidths in b-th level bandwidths, and a bandwidth index occupied by the measurement reference signal in a frequency hopping bandwidth level changes over time; where the bandwidth index occupied by the measurement reference signal in a frequency hopping bandwidth level in the frequency hopping bandwidth level set changes over time, at least one of $b_{hop}$ or $B_{SRS}$ is a predetermined value, or at least one of $b_{hop}$ or $B_{SRS}$ is included in the received signaling information, and $b_{hop}$ and $B_{SRS}$ are nonnegative integers.

In one embodiment, in response to the frequency hopping bandwidth level set being $\{b_{hop}+1, b_{hop}+2, \ldots, B_{SRS}\}$, the restriction condition is:
the parameter of the measurement reference signal satisfies the following formula:

$$\sum_{b=b_{hop}+1}^{B_{SRS}} N_b$$

is less than or equal to $$\frac{N_s}{R}.$$

In the above formula, $b_{hop}$ is a predetermined value, or $b_{hop}$ is included in the received signaling information.

In one embodiment, in a case where a first communication node is a communication node transmitting the measurement reference signal, before the measurement reference signal is transmitted using the parameter of the measurement reference signal, the method further includes at least one of the following steps.

The first communication node is not expected to receive measurement reference signal parameter configuration which does not satisfy the restriction condition (in one embodiment, not expected is a technical term in the 3rd Generation Partnership Project (3GPP) standard), that is, the first communication node is expected to receive measurement reference signal parameter configuration which satisfies the restriction condition; and in a case where the first communication node receives the measurement reference signal parameter configuration which does not satisfy the restriction condition, the first communication node does not transmit the measurement reference signal.

In a case where the first communication node receives the measurement reference signal parameter configuration which does not satisfy the restriction condition, the first communication node sends predetermined indication information (herein, the predetermined indication information may be sent to a higher layer of the first communication node, or a second communication node, where the second communication node is a peer end transmitting the measurement reference signal).

In the above steps, the first communication node is a communication node transmitting the measurement reference signal.

Figure 6:
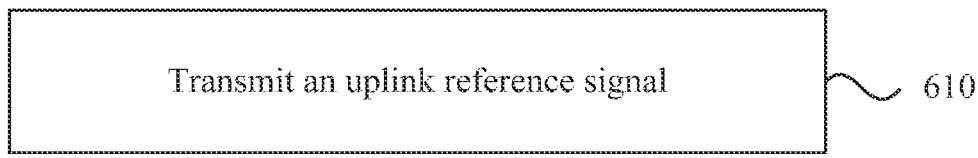
FIG. 6 is a flowchart of a method for transmitting an uplink reference signal according to an embodiment of the present disclosure.

According to another embodiment of the present disclosure, a method for transmitting an uplink reference signal is further provided. As shown in FIG. 6, the method includes step 610.

In a step 610, an uplink reference signal is transmitted.

In one embodiment, transmitting includes sending and/or receiving.

In a case where the uplink reference signal uses the time domain OCC, the uplink reference signal satisfies at least one of the following:
  a length of a time domain OCC corresponding to the uplink reference signal is less than or equal to a frequency domain repeated sending parameter R corresponding to the uplink reference signal, where the frequency domain repeated sending parameter R is the number of time domain symbols included in a unit of frequency domain hopping of the uplink reference signal;
  the length of the time domain OCC corresponding to the uplink reference signal is less than or equal to a sequence repetition parameter R5 of the uplink reference signal; or
  the length of the time domain OCC has an association with a sequence parameter of the uplink reference signal, where R and R5 are positive integers.

In one embodiment, the uplink reference signal includes: an uplink demodulation reference signal, an uplink phase tracking reference signal, an uplink random channel sequence, and the like.

In one embodiment, the association between the length of the time domain OCC and the sequence parameter of the uplink reference signal includes at least one of the following:
  in a case where the length of the time domain OCC is greater than 1, sequences corresponding to R1 time domain symbols occupied by one uplink reference signal port in one time unit are the same; or
  in a case where sequences corresponding to R1 time domain symbols occupied by one uplink reference signal port in one time unit are different, a length of a time domain OCC corresponding to the uplink reference signal port is 1; where R1 at least satisfies one of the following features: R1 is less than or equal to R, R1 is the length of the time domain OCC, or R1 is less than or equal to N, where N is the number of time domain symbols occupied by the one uplink reference signal port in one time unit. According to another embodiment of the present disclosure, a method for transmitting a measurement reference signal is further provided. The method includes steps 710 and 720.

In step 710, a parameter of a measurement reference signal is determined according to an agreed restriction condition.

In step 720, the measurement reference signal is transmitted using the parameter.

In one embodiment, the step of determining the parameter of the measurement reference signal according to the agreed restriction condition includes: determining a frequency hopping parameter of the measurement reference signal according to the agreed restriction condition.

In one embodiment, the measurement reference signal is a measurement reference signal triggered by physical layer dynamic signaling, and thus may also be referred to as an aperiodic measurement reference signal.

In one embodiment, the parameter of the measurement reference signal includes a first parameter set and a second parameter set; where the second parameter set is determined according to the first parameter set and the restriction condition.

In one embodiment, the method satisfies at least one of the following features.

The first parameter set is included in received signaling information.

The second parameter set is not included in the received signaling information.

The second parameter set includes level information of a bandwidth occupied by the measurement reference signal on one time domain symbol.

An intersection set of the first parameter set and the second parameter set is empty.

At least one of the first parameter set and the second parameter set including one of the following parameters: an index of a multilevel bandwidth structure, level information of a bandwidth occupied by the measurement reference signal on one time domain symbol, frequency hopping bandwidth level information of the measurement reference signal, information about the number of time domain symbols occupied by the measurement reference signal in one time unit, or a repeated sending parameter of the measurement reference signal in one time unit.

In one embodiment, the restriction condition is:
  the parameter of the measurement reference signal satisfies the following formula:

$$\sum_{b \in b_{hopA}} N_b$$

is less than $$\frac{N_s}{R}.$$

In the above formula, b is bandwidth level information in the multilevel bandwidth structure, $b_{hopA}$ is a frequency hopping bandwidth level set, $N_s$ is the number of time domain symbols occupied by the measurement reference signal in one time unit, and R is a frequency domain repeated sending parameter of the measurement reference signal; where the multilevel bandwidth structure includes multiple bandwidth levels, one bandwidth in (b−1)-th level bandwidths includes $N_b$ bandwidths in b-th level bandwidths, and a bandwidth index occupied by the measurement reference signal in a frequency hopping bandwidth level changes over time; where the bandwidth index occupied by the measurement reference signal in a frequency hopping bandwidth level in the frequency hopping bandwidth level set changes over time.

In one embodiment, in a case where the frequency hopping bandwidth level set is $\{b_{hop}+1, b_{hop}+2, \ldots, B_{SRS}\}$, the restriction condition is:

the parameter of the measurement reference signal satisfies the following formula:

$$\sum_{b=b_{hop}+1}^{B_{SRS}} N_b$$

is less than or equal to $$\frac{N_s}{R}.$$

In the above formula, $b_{hop}$ is a predetermined value, or $b_{hop}$ is included in the received signaling information.

In one embodiment, in a case where a first communication node is a communication node transmitting the measurement reference signal, before the measurement reference signal is transmitted using the parameter of the measurement reference signal, the method further includes at least one of the following steps.

The first communication node is not expected to receive measurement reference signal parameter configuration which does not satisfy the restriction condition (in one embodiment, not expected is a technical term in the 3GPP standard).

In a case where the first communication node receives measurement reference signal parameter configuration which does not satisfy the restriction condition, the first communication node does not transmit the measurement reference signal.

In a case where the first communication node receives the measurement reference signal parameter configuration which does not satisfy the restriction condition, the first communication node sends predetermined indication information (herein, the predetermined indication information may be sent to a higher layer of the first communication node, or a second communication node, where the second communication node is a peer end transmitting the measurement reference signal).

In the above steps, the first communication node is a communication node transmitting the measurement reference signal.

According to another embodiment of the present disclosure, a method for transmitting a measurement reference signal is further provided. The method includes steps 810 and 820.

In step 810, a parameter of a measurement reference signal is determined according to an agreed restriction condition.

In step 820, the measurement reference signal is transmitted using the parameter.

In one embodiment, the step of determining the parameter of the measurement reference signal according to the agreed restriction condition includes: determining a frequency hopping parameter of the measurement reference signal according to the agreed restriction condition.

In one embodiment, the measurement reference signal is a measurement reference signal triggered by physical layer dynamic signaling, and thus may also be referred to as the aperiodic measurement reference signal.

In one embodiment, the parameter of the measurement reference signal includes a first parameter set and a second parameter set; where the second parameter set is determined according to the first parameter set and the restriction condition.

In one embodiment, the method satisfies at least one of the following features.

The first parameter set is included in received signaling information.

The second parameter set is not included in the received signaling information.

The second parameter set includes level information of a bandwidth occupied by the measurement reference signal on one time domain symbol.

An intersection set of the first parameter set and the second parameter set is empty.

At least one of the first parameter set and the second parameter set including one of the following parameters: an index of a multilevel bandwidth structure, level information of a bandwidth occupied by the measurement reference signal on one time domain symbol, frequency hopping bandwidth level information of the measurement reference signal, information about the number of time domain symbols occupied by the measurement reference signal in one time unit, or a repeated sending parameter of the measurement reference signal in one time unit.

In one embodiment, the restriction condition is:

the parameter of the measurement reference signal satisfies the following formula:

$$\sum_{b=b_{hop}+1}^{B_{SRS}} N_b$$

is less than or equal to $$\frac{N_s}{R}.$$

In the above formula, b is bandwidth level information in the multilevel bandwidth structure, $N_s$ is the number of time domain symbols occupied by the measurement reference signal in one time unit, and R is a frequency domain repeated sending parameter of the measurement reference signal; where the multilevel bandwidth structure includes multiple bandwidth levels, one bandwidth in a (b−1)-th level bandwidths includes $N_b$ bandwidths in b-th level bandwidths, and a bandwidth index occupied by the measurement reference signal in a frequency hopping bandwidth level changes over time; where the bandwidth index occupied by the measurement reference signal in a frequency hopping bandwidth level in the frequency hopping bandwidth level set changes over time, at least one of $b_{hop}$ or $B_{SRS}$ is a predetermined value, or at least one of $b_{hop}$ or $B_{SRS}$ is included in the received signaling information, and $b_{hop}$ and $B_{SRS}$ are non-negative integers.

In one embodiment, in a case where the frequency hopping bandwidth level set $b_{hopA}$ is $\{b_{hop}+1, b_{hop}+2, \ldots, B_{SRS}\}$, the restriction condition is:

the parameter of the measurement reference signal satisfies the following formula:

$$\sum_{b=b_{hop}+1}^{B_{SRS}} N_b$$

is less than or equal to $$\frac{N_s}{R}.$$

In the above formula, $b_{hop}$ is a predetermined value, or $b_{hop}$ is included in the received signaling information.

In one embodiment, in a case where a first communication node is a communication node transmitting the measurement reference signal, before the measurement reference signal is transmitted using the parameter of the measurement reference signal, the method further includes at least one of the following steps.

The first communication node is not expected to receive measurement reference signal parameter configuration which does not satisfy the restriction condition (in one embodiment, not expected is a technical term in the 3GPP standard), that is, the first communication node is expected to receive measurement reference signal parameter configuration which satisfies the restriction condition.

In a case where the first communication node receives measurement reference signal parameter configuration which does not satisfy the restriction condition, the first communication node does not transmit the measurement reference signal.

In a case where the first communication node receives the measurement reference signal parameter configuration which does not satisfy the restriction condition, the first communication node sends predetermined indication information (herein, the predetermined indication information may be sent to a higher layer of the first communication node, or a second communication node, where the second communication node is a peer end transmitting the measurement reference signal).

In the above steps, the first communication node is a communication node transmitting the measurement reference signal.

The present disclosure will be described below in conjunction with examples of the present disclosure.

EXAMPLE ONE

In this example of the present disclosure, an uplink measurement reference signal may be sent by using a time domain OCC, where the time domain OCC is less than or equal to a frequency domain repeated sending parameter R corresponding to the uplink measurement reference signal in one slot, where the frequency domain repeated sending parameter R of the uplink measurement reference signal represents that frequency domain resources occupied by the measurement reference signal on R time domain symbols are the same, where the frequency domain resources include at least one of the following resources: frequency domain PRBs, and subcarriers in a PRB.

A base station notifies a terminal of the time domain OCC used by its measurement reference signal. For example, one measurement reference signal includes one port which may correspond to one OCC as shown in Table 1. Table 1 is a schematic table one according to Example 1.

TABLE 1

| Measurement Reference Signal Port | OCC |
|---|---|
| Port 0 | [1, 1, 1, 1] |
| Port 1 | [1, −1, 1, −1] |
| Port 2 | [1, 1, −1, −1] |
| Port 3 | [1, −1, −1, 1] |

Figure 7:
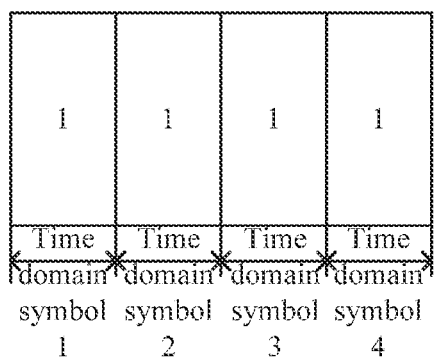
FIG. 7 is a schematic diagram illustrating a mapping relationship between a time domain OCC corresponding to a port 0 and time domain symbols according to an embodiment of the present disclosure.
Figure 8:
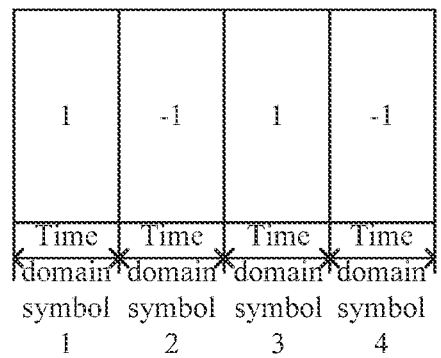
FIG. 8 is a schematic diagram illustrating a mapping relationship between a time domain OCC corresponding to a port 1 and time domain symbols according to an embodiment of the present disclosure.

In Table 1, different OCCs correspond to different ports. As shown in FIGS. 7 and 8, mapping from OCCs to time domain symbols is illustrated. FIG. 7 is a schematic diagram illustrating a mapping relationship between a time domain OCC corresponding to a port 0 and time domain symbols according to the present disclosure, and FIG. 7 illustrates mapping from an OCC of the port 0 to time domain symbols. FIG. 8 is a schematic diagram of a mapping relationship between a time domain OCC corresponding to a port 1 and time domain symbols according to the present disclosure, and FIG. 8 illustrates mapping of OCCs from the port 1 to time domain symbols. In this case, the measurement reference signal port index may be informed by signaling. For example, an SRS resource 1 includes the port 0 and an SRS resource 2 includes port 1, and although both SRS resource 1 and SRS resource 2 include one port, one of them corresponds to the port 0 and the other corresponds to the port 1, where the SRS resource 1 and the SRS resource 2 may be SRS resources allocated to different terminals. Four time domain symbols participating in the time domain OCC in each of FIGS. 7 and 8 may be consecutive time domain symbols, or inconsecutive time domain symbols, or time domain symbols in one slot, or time domain symbols in multiple slots.

In another implementation manner of this example, the base station directly signals an OCC index, one SRS resource corresponds to one OCC, and multiple ports included in one SRS resource share one OCC, as shown in Table 2. Table 2 is a schematic table two according to Example 1.

TABLE 2

| OCC Index | OCC |
|---|---|
| Index 0 | [1, 1, 1, 1] |
| Index 1 | [1, −1, 1, −1] |
| Index 2 | [1, 1, −1, −1] |
| Index 3 | [1, −1, −1, 1] |

For example, both an SRS resource 3 and an SRS resource 4 are resources including four SRS ports, the SRS resource 3 corresponds to the OCC index 0, the SRS resource 4 corresponds to the OCC index 1, and four SRS ports in the SRS resource 3 share the time domain OCC [1, 1, 1, 1]. In another implementation manner of this example, all SRS ports included in all SRS resources in one SRS resource set share one time domain OCC index. Of course, this example does not exclude that different SRS ports in one SRS resource use different time domain OCCs.

In the above-described manner of this example, the base station notifies the terminal of the time domain OCC index used by the SRS through signaling information. For example, the base station signals a port index used by the SRS, or a time domain OCC index used by the SRS. The base station may further signal length information of the time domain OCC.

In another implementation manner of this example, the base station may also agree on a rule with the terminal, so that the terminal may obtain the information described above through the agreed rule. For example, the terminal may obtain an OCC index (or a port index) used by the terminal through an SRS resource ID, for example, a code index $OCC_{index}=(SRSID)\text{mod}T$ of a time domain OCC, where SRSID is an identifier (ID) of the SRS resource, and T is the total number of available OCCs, or a length of the time domain OCC. Similarly, the time domain OCC index may be obtained through an ID of an SRS resource group or set in which the SRS resource is located, or an identity number of the terminal. For example, the time domain OCC index may be obtained through a C-RNTI.

In the present application, the uplink measurement reference signal may also be referred to as the uplink sounding reference signal.

EXAMPLE TWO

In this example, a time domain OCC of an SRS has an association with an SRS sequence.

In one embodiment, the length of the time domain OCC of the SRS is associated with whether the SRS sequence changes with the time domain symbol, or whether the time domain OCC of the SRS is enabled is associated with whether the SRS sequence changes with the time domain symbol, or the length of the time domain OCC of the SRS is associated with whether an SRS sequence parameter changes with the time domain symbol, where the SRS sequence parameter may be at least one of the following parameters: a sequence group number, or a sequence number.

In one embodiment, the length of the time domain OCC of the SRS is 1, which may also be referred to that the time domain OCC of the SRS is not enabled. The length of the time domain OCC of the SRS is greater than 1, which may also be referred to that the time domain OCC of the SRS is enabled.

In a case where the length of the time domain OCC of the SRS is greater than 1, the sequence of the SRS is invariant in a time domain symbol in which the time domain OCC is located; in a case where the length of the time domain OCC of the SRS is equal to 1, the sequence of the SRS is variable in the time domain symbol in which the time domain OCC is located; and/or in a case where the length of the time domain OCC of the SRS is greater than 1, the sequence group number of the SRS is invariant in the time domain symbol in which the time domain OCC is located; in a case where the length of the time domain OCC of the SRS is equal to 1, the sequence group number of the SRS is variable in the time domain symbol in which the time domain OCC is located; and/or in a case where the length of the time domain OCC of the SRS is greater than 1, the sequence number of the SRS is invariant in the time domain symbol in which the time domain OCC is located; in a case where the length of the time domain OCC of the SRS is equal to 1, the sequence number of the SRS is variable in the time domain symbol in which the time domain OCC is located.

In one embodiment, the sequence $r_{u,v}^{(\alpha,\delta)}(n)$ of the SRS in the NR is acquired through the following formula.

$$r_{u,v}^{(\alpha,\delta)}(n) = e^{j\alpha\left(n+\delta\frac{\omega\text{mod}2}{2}\right)}\bar{r}_{u,v}(n), 0 \leq n < M_{sc}^{RS} \qquad (1\text{-}0)$$

When the time domain OCC is adopted, a reference signal sent on the SRS is acquired through the following formula.

$$S_{u,v}^{(\alpha,\delta)}(n,l)=w(l)r_{u,v}^{(\alpha,\delta)}(n), 0 \leq n < M_{sc}^{RS} \qquad (1\text{-}1)$$

In the above formula, $M_{sc}^{RS}=mN_{sc}^{RB}/2^{\delta}$ is the sequence length of the SRS, m is the number of PRBs occupied by the SRS, $\delta$ is the total number of combs in the Interleaved Frequency Division Multiple Access (IFDMA) manner, $\alpha$ is a cyclic shift parameter, $\bar{\omega}$ belongs to {0, 1} or is fixed to 0, and w(l) is an element of the time domain OCC on the time domain symbol l, or is referred to as a phase scrambling factor of the time domain OOC on the time domain symbol l.

In one embodiment, in response to $\bar{\omega}$ being fixed to 0, the formula (1-0) is equivalent to:

$$r_{u,v}^{\alpha}(n)=e^{j\alpha n}\bar{r}_{u,v}(n), 0 \leq n < M_{sc}^{RS}.$$

In the present application, the sequence corresponding to the SRS is a symbol set to be transmitted by the SRS before the SRS is multiplied by the time domain OCC. For example, multiple symbols to be transmitted by the SRS on multiple resource elements (REs) occupied by the SRS on one time domain symbol form the sequence, that is, $r_{u,v}^{(\alpha,\delta)}(n)$, n=0, 1, 2 . . . $M_{SC}^{RS}$ in the formula (1-1) forms a sequence corresponding to the SRS.

In response to the sequence length $M_{SC}^{RS}$ of the SRS being greater than $2N_{SC}^{NB}$ ($N_{SC}^{NB}$ is the number of subcarriers included in one PRB, and for example, in LTE and NR, $N_{SC}^{NB}$ is 12), $$\bar{r}_{u,v}(n) = x_q(n \text{mod} N_{zc}^{RS}), n = 0, 1, \ldots, M_{SC}^{RS} - 1,$$

$$x_q(m) = e^{-j\frac{\pi qm(m+1)}{N_{zc}^{RS}}}, m = 0, 1, \ldots, N_{zc}^{RS} - 1,$$

$$q = \lfloor \bar{q} + 1/2 \rfloor + v \times (-1)^{\lfloor 2\bar{q} \rfloor}; \text{ and}$$

$$\bar{q} = N_{zc}^{RS}(u+1)/31.$$

In the above formulas, v is the sequence number and belongs to {0, 1}, $0 \leq \alpha \leq 2\pi$, $N_{zc}^{RS}$ is a largest prime less than or equal to $M_{SC}^{RS}$. In one embodiment, when the number of PRBs occupied by the SRS is less than 6, v is 0; otherwise, v may be 0 or 1.

In response to the sequence length $M_{SC}^{RS}$ of the SRS being less than or equal to $2N_{SC}^{NB}$, $$\bar{r}_{u,v}(n)=e^{j\varphi(n)\pi/4}, n=0,1,\ldots,M_{SC}^{RS}-1.$$

In the above formula, $\varphi(n)$ is obtained by searching a preset table according to the sequence group number u.

The sequence group number u is obtained through the following formula.

$$u = (f_{gh}(n_s) + f_{ss}) \bmod 30 \quad (1)$$

$$f_{gh}(n_s) = \begin{cases} 0 & \text{if the group hop is not enabled} \\ \left(\sum_{i=0}^{7} c(8h() + i) \cdot 2^i\right) \bmod 30 & \text{if the group hop is enabled} \end{cases} \quad (2)$$

In the above formulas, c(z) is the z-th value in a Pseudo-random sequence. Once an initialization value $c_{init}$ is given, a random sequence can be generated. The initialization value in the sequence generation is $$c_{init} = \left\lfloor \frac{n_{ID}^{RS}}{30} \right\rfloor,$$

$f_{ss} = n_{ID}^{RS} \bmod 30$, where $n_{ID}^{RS}$ is a parameter configured by the higher-layer or a physical cell identification number.

A length-31 Pseudo-random sequence is generated in the following manner.

$$c(n) = (x_1(n+N_c) + x_2(n+N_c)) \bmod 2$$

$$x_1(n+31) = (x_1)(n+3) + x_1(n)) \bmod 2$$

$$x_2(n+31) = (x_2)(n+3) + x_2(n+2) + x_2(n+1) + x_2(n)) \bmod 2$$

n=0, 1, . . . , $M_{PN}$−1, $N_C$=1600, $x_1(0)$=1, $x_1(n)$=0, n=1, 2, . . . 30, and $c_{init} = \sum_{i=0}^{30} x_2(i) \cdot 2^i$.

In formula (2), h( ) is a function with respect to the time parameter, and therefore, the sequence group number corresponding to one measurement reference signal port or one measurement reference signal resource will change with the time domain symbol.

Figure 9:
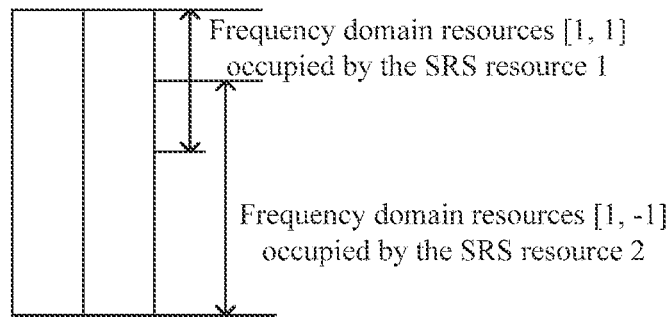
FIG. 9 is a schematic diagram illustrating orthogonalization of two SRS resources partially overlapping in frequency domain via a time domain OCC according to an embodiment of the present disclosure.

However, when the SRS uses the time domain OCC to be orthogonal, the two SRS resources 1 and 2 having the partial frequency domain overlapping are orthogonal to each other. FIG. 9 is a schematic diagram illustrating orthogonalization of two SRS resources partially overlapping in frequency domain via a time domain OCC according to the present disclosure. As shown in FIG. 9, in order to make the port in the SRS resource 1 and the port in the SRS resource 2 orthogonal to each other, the time domain OCC may be used. Since the sequences corresponding to the overlapping portion of the SRS resource 1 and the SRS resource 2 are different, in this case, in order to be orthogonal, the SRS resource 1 uses the same sequence on two time domain symbols in which the time domain OCC is located, and similarly, the SRS resource 2 uses the same sequence on two time domain symbols in which the time domain OCC is located, such that the sequence group number u does not change on the time domain symbols in which the time domain OCC is located.

In other words, the h( ) function does not include the time domain symbol index, or multiple time domain symbols of the time domain symbols in which the time domain OCC is located have the same value in the h( ) function.

Therefore, the base station and the terminal can agree that the acquisition parameter of h( ) does not include the time domain symbol index when the length of the time domain OCC is greater than 1, and the acquisition parameter of h( ) includes the time domain symbol index when the length of the time domain OCC is 1; or the base station and the terminal agree that the hopping of the sequence group number u over time is not enabled when the length of the time domain OCC is greater than 1, and the hopping of the sequence group number u over time is enabled when the length of the time domain OCC is 1; or the base station and the terminal agree that multiple time domain symbols in which the time domain OCC is located take the same value in h( ) when the length of the time domain OCC is greater than 1, and multiple time domain symbols in which the time domain OCC is located may take different values in h( ) when the length of the time domain OCC is equal to 1.

Similarly, for example, the sequence number v is obtained through the following formula:

$$V = \begin{cases} 0, & \text{sequence number } hoppoing \text{ is not enabled} \\ c(z_1), & \text{sequence number hopping is enabled} \end{cases}.$$

When the hopping of the sequence number is enabled, $v = c(z_1)$, and the base station and the terminal may agree that the acquisition parameter of $z_1$ does not include the time domain symbol index when the length of the time domain OCC is greater than 1, and the acquisition parameter of $z_1$ includes the time domain symbol index when the length of the time domain OCC is equal to 1; or the base station and the terminal may agree that the hopping of the sequence number v over time is not enabled when the length of the time domain OCC is greater than 1, and the hopping of the sequence number v over time is enabled when the length of the time domain OCC is equal to 1; or the base station and the terminal agree that multiple time domain symbols in which the time domain OCC is located take the same value in $z_1$ when the length of the time domain OCC is greater than 1, and multiple time domain symbols in which the time domain OCC is located may take different values in $z_1$ when the length of the time domain OCC is equal to 1.

In the above implementation manner, the length of the time domain OCC is related to the sequence, or a code set of the time domain OCC may be related to the sequence. For example, the terminal and the base station agree that in response to the time domain OCC belonging to a set 1={(1, 1, 1, 1, 1)}, the acquisition parameter of h( ) includes the time domain symbol index, or the hopping of the sequence group number u over time is enabled, or four time domain symbols in which the time domain OCC is located may take different values in h( ); in response to the time domain OCC belonging to a set 2={(1, −1, 1, −1), (1, 1, −1, −1), (1, −1, −1, 1)}, the acquisition parameter of h( ) does not include the time domain symbol index, or the hopping of the sequence group number u over time is not enabled, or four time domain symbols in which the time domain OCC is located may take the same value in h( ).

Similarly, the code set of the time domain OCC may also be related to the sequence number v. For example, the terminal and the base station agree that in response to the time domain OCC belonging to the set 1={(1, 1, 1, 1, 1)}, the acquisition parameter of $z_1$ includes the time domain symbol index, or the hopping of the sequence number v over time is enabled, or four time domain symbols in which the time domain OCC is located may take different values in $z_1$; in response to the time domain OCC belonging to the set 2={(1, −1, 1, −1), (1, 1, −1, −1), (1, −1, −1, 1)}, the acquisition parameter of $z_1$ does not include the time domain symbol index, or the hopping of the sequence number v over time is not enabled, or four time domain symbols in which the time domain OCC is located may take the same value in $z_1$.

The division of the code set 1 of the time domain OCC and the code set 2 of the time domain OCC is only an example, and other division manners are not excluded. In a word, the time domain code set has an association with a generation mode of the sequence, or the time domain code set has an association with a parameter of the sequence.

EXAMPLE THREE

In this example, when the uplink reference signal uses the time domain OCC, the length of the time domain OCC satisfies at least one of the following features.

Figure 10:
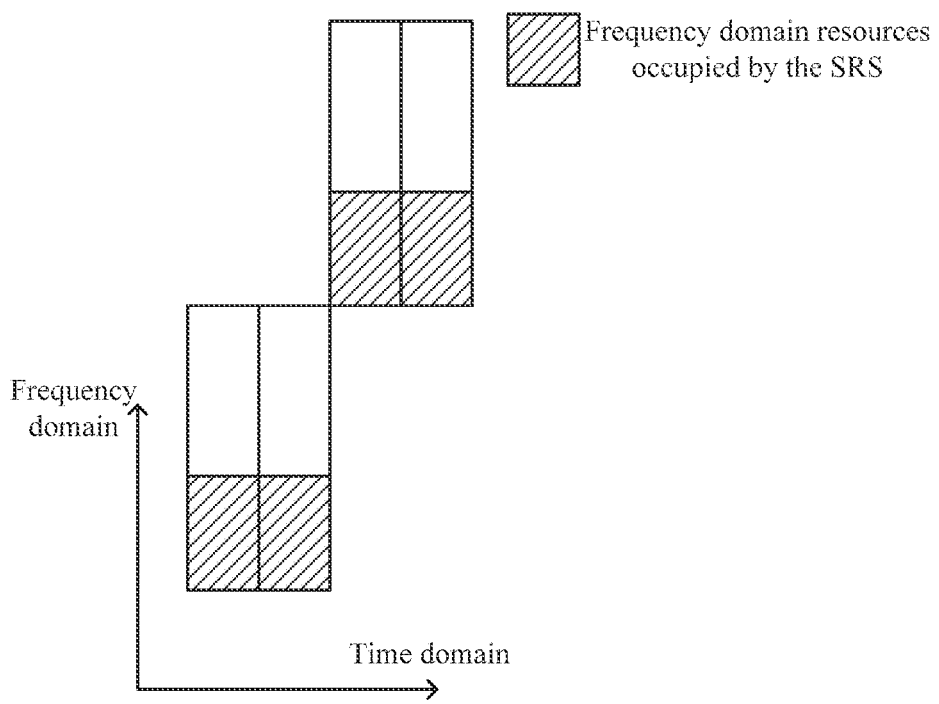
FIG. 10 is a schematic diagram illustrating a frequency domain repeated sending parameter R of an SRS being 2 according to an embodiment of the present disclosure.

The feature one is as follows: a length of a time domain OCC corresponding to the measurement reference signal is less than or equal to a frequency domain repeated sending parameter R corresponding to the measurement reference signal, where the frequency domain repeated sending parameter R is the number of time domain symbols included in a unit of frequency domain hopping of the measurement reference signal in one unit. FIG. 10 is a schematic diagram illustrating a frequency domain repeated sending parameter R of an SRS being 2 according to the present disclosure. As shown in FIG. 10, one measurement reference signal port occupies four symbols in one slot. Frequency domain resources occupied by the SRS in the first two time domain symbols are the same, and frequency domain locations occupied by the SRS in the last two time domain symbols are the same. Frequency domains occupied by the SRS in the first two time domain symbols are different from frequency domains occupied by the SRS in the last two time domain symbols, for example, the SRS occupies different PRBs, but combs occupied in IFDMA may be the same. In FIG. 10, the frequency domain repeated sending parameter R represents that frequency domain resources (frequency domain resources include frequency domain PRBs and frequency domain subcarriers) occupied by the measurement reference signal on R time domain symbols in one time unit are not changed, and may also represent that frequency domain hopping is performed once after the measurement reference signal is sent every R time domain symbols (that is, the measurement reference signal is sent on R time domain symbols), where the R time domain symbols may be located in different slots or may be located in the same time unit. The frequency domain resources include at least one of following resources: PRBs, subcarriers in the PRB, or subcarriers.

Figure 11:
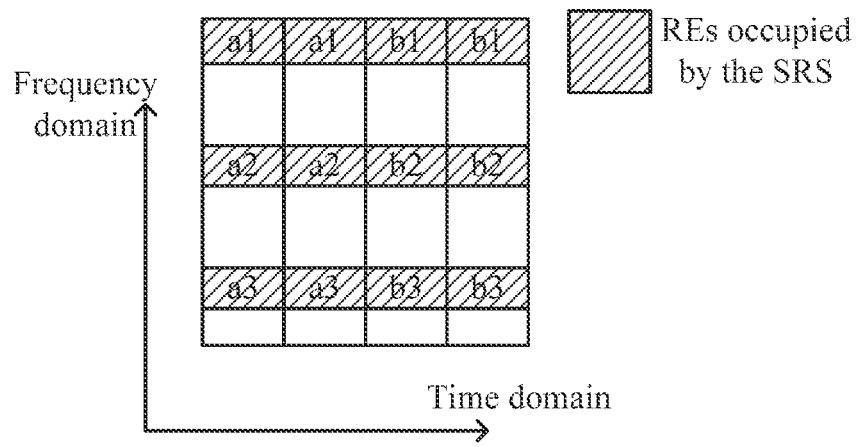
FIG. 11 is a schematic diagram illustrating a sequence repetition parameter R5 of an SRS being 2 according to an embodiment of the present disclosure.
Figure 12:
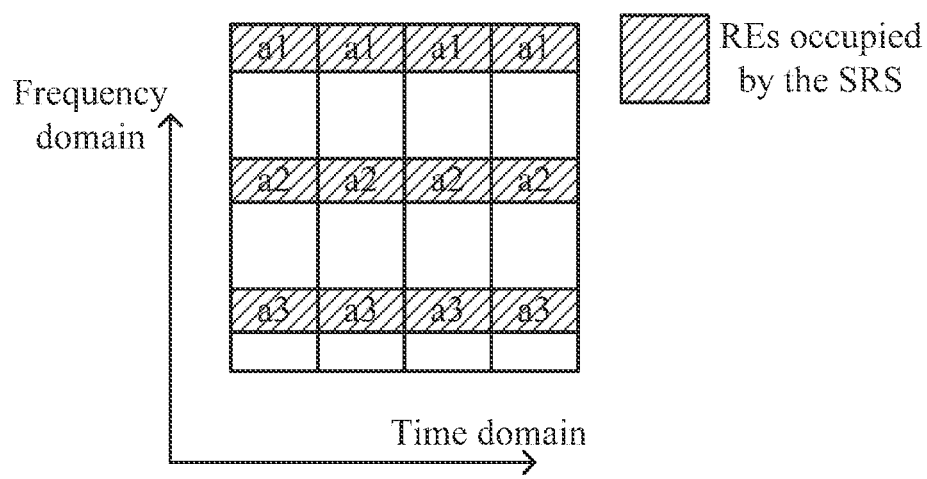
FIG. 12 is a schematic diagram illustrating a sequence repetition parameter R5 of an SRS being 4 according to an embodiment of the present disclosure.
Figure 13:
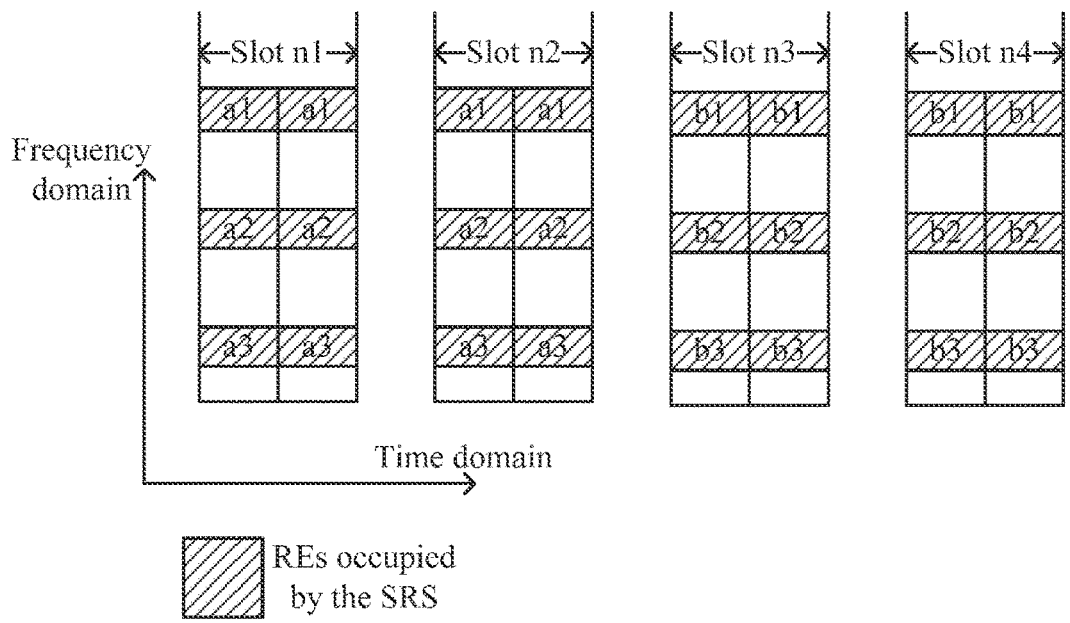
FIG. 13 is a schematic diagram illustrating a sequence repetition parameter R5 of an SRS being 4 and one sequence repetition sending unit including time domain symbols in more than one slot according to the present disclosure.

The feature two is as follows: the length of the time domain OCC corresponding to the measurement reference signal is less than or equal to a sequence repetition parameter R5 of the measurement reference signal, where the sequence of the uplink reference signal and/or the sequence parameter of the uplink reference signal is invariant over the R5 time domain symbols. FIG. 11 is a schematic diagram illustrating a sequence repetition parameter R5 of an SRS being 2 according to the present disclosure. As shown in FIG. 11, one SRS port occupies four time domain symbols in one slot. Sequences occupied by the SSRS in the first two time domain symbols are the same, that is, symbols used by the SRS on the same subcarriers in the first two time domain symbols are the same (for example, symbols of the SRS on a first subcarrier before the time domain OCC are a1, that is, $r_{u,v}^{(\alpha,\delta)}(n)$ on the RE in the formula (1-0) is a1). Sequences used by the SRS in the last two time domain symbols are the same, that is, symbols used by the SRS on the same subcarriers in the last two time domain symbols are the same. Therefore, the sequence repetition parameter R5 of the SRS is equal to 2, so that the time domain OCC can only be mapped on the first two time domain symbols, or mapped on the last two time domain symbols, and the length of the time domain OCC is less than or equal to 2. FIG. 12 is a schematic diagram illustrating a sequence repetition parameter R5 of an SRS being 4 according to the present disclosure. As shown in FIG. 12, one SRS port occupies four symbols in one slot. Sequences occupied by the SRS in the four time domain symbols are the same, that is, the symbols used by the SRS on the same subcarriers in the four time domain symbols before the time domain OCC are the same. Therefore, the sequence repetition parameter R5 of the SRS is equal to 4, and the length of the time domain OCC may be less than or equal to 4. In FIGS. 11 to 12, one SRS port occupies four time domain symbols in one slot. In this example, the acquisition of the sequence repetition parameter R5 of the SRS may also be cross-slot. FIG. 13 is a schematic diagram illustrating a sequence repetition parameter R5 of an SRS being 4 and one sequence repetition sending unit including time domain symbols in more than one slot according to the present disclosure, that is, as shown in FIG. 13, the sequence repetition parameter R5 of the SRS is 4, and the sequence repetition parameter R5 may also be referred to as the number of time domain symbols for sequence hopping. The sequence repetition parameter R5 may also be referred to as a relationship between the SRS sequence and the time domain symbol. In one embodiment, the sequence repetition parameter R5 is also referred to as a sequence repetition sending parameter.

The feature three is as follows: the length of the time domain OCC includes a length 1. The length of the time domain OCC being 1 may also be referred to that the time domain OCC is not enabled. In the present application, the length of the time domain OCC belongs to $\{1, 2, 4\}$, or the length of the time domain OCC belongs to $\{1, 2, 4, 8\}$.

The feature four is as follows: the length of the time domain OCC has an association with the sequence parameter of the measurement reference signal. For example, when the length of the time domain OCC is greater than 1, sequences corresponding to one SRS port on R1 time domain symbols occupied in one time unit are the same, and/or when the length of the time domain OCC is greater than 1, sequence group numbers corresponding to one SRS port on R1 time domain symbols occupied in one time unit are the same (the sequence group number is u described in Example 1). When the length of the domain OCC is greater than 1, sequence numbers corresponding to one SRS port on R1 time domain symbols occupied in one time unit are the same (the sequence number is v described in Example 1). When sequences corresponding to one SRS port on R1 time domain symbols occupied in one time unit are different, the length of the time domain OCC corresponding to the measurement reference signal port is 1; when sequence group numbers corresponding to one SRS port on R1 time domain symbols occupied in one time unit are different, the length of the time domain OCC corresponding to the measurement reference signal port is 1; and when sequence numbers corresponding to one SRS port on R1 time domain symbols occupied in one time unit are different, the length of the time domain OCC corresponding to the measurement reference signal port is 1.

R1 at least satisfies one of the following features: R1 is less than or equal to R, R1 is the length of the time domain OCC, or R1 is less than or equal to N, where N is the number of time domain symbols included by the measurement reference signal in one time unit.

In the above example, the R1 time domain symbols are in one time unit, for example, in one slot. Of course, this example does not exclude a case that the R1 time domain symbols may include time domain symbols in multiple time units, for example, the R1 time domain symbols include time domain symbols in more than one slot.

In this example, Features one to four are described with the uplink measurement reference signal as an example. Of course, other uplink reference signals may also apply to one or more features of Features one to four, for example, the uplink demodulation reference signal, the uplink phase tracking reference signal or the uplink random channel sequence (preamble).

EXAMPLE FOUR

In this example, the base station sends signaling information to the terminal, where the signaling information includes at least one of the following: information about a correspondence between the sequence and the time domain symbol, or a time domain OCC corresponding to a time domain symbol set, which may also be referred to as a phase scrambling factor corresponding to the time domain symbol in the time domain symbol set.

The information about the correspondence between the sequence and the time domain symbol includes at least one of the following: information about whether the sequence parameter changes on R2 time domain symbols in one time unit; information about whether the sequence changes on R2 time domain symbols in one time unit; the sequence hopping once every R3 time domain symbols (that is, the sequence hops once after R3 time domain symbols occupied by the measurement reference signal); and the sequence parameter hopping once every R3 time domain symbols (that is, the sequence parameter hops once after R3 time domain symbols occupied by the measurement reference signal); where the sequence parameter is used for generating the sequence, and for example, the sequence parameter includes at least one of the following parameters: a sequence group number (for example, the parameter u described in Example one), or a sequence number (for example, the parameter v described in Example one). In a word, the sequence parameters hops once after R3 time domain symbols occupied by the channel or signal, where the R3 time domain symbols may be in one time unit, or in multiple time units, where one time unit may be one slot, or one subframe, and of course other time units are not excluded. In one embodiment, the time domain OCC corresponding to the time domain symbol set may also be referred to as a phase scrambling factor corresponding to the time domain symbol in the time domain symbol set.

In one embodiment, R2 or R3 satisfy at least one of the following features: R2 or R3 is less than or equal to R, R2 or R3 is less than or equal to a length of a time domain OCC corresponding to a channel or a signal, or R2 or R3 is less than or equal to N, where N is the number of time domain symbols included by the channel or the signal in one time unit, and the channel or the signal is a channel or a signal corresponding to the signaling information. In one embodiment, R2 and R3 are also referred to as the sequence repetition sending parameter, or the sequence hopping parameter, or other equivalent names.

The sequence is transmitted on the following channel or signal: a control channel, a data channel, a measurement reference signal, or a demodulation reference signal. The orthogonalization between the SRS and the control channel can be achieved through using the time domain OCC such that time domain OCC information used by the control channel and the time domain OCC used by the SRS are notified. Similarly, the time domain OCC index used by the data channel can be notified, or the time domain OCC index used by the demodulation reference signal can be notified.

In one embodiment, a signal transmitted on the time domain symbol in the time domain symbol set is transmitted by the channel or signal corresponding to the signaling information after the signal is multiplied by the time domain OCC corresponding to the time domain symbol in the time domain symbol set.

Alternatively, when signals transmitted on multiple time domain symbols in the time domain symbol set by the channel or signal corresponding to the signaling information are the same, the signals are transmitted after being multiplied by the time domain OCC. For example, the orthogonalization between the uplink control channel and the SRS on the same frequency domain resource can be achieved through the time domain OCC, but since the sequences used by the uplink control channel and the SRS are different, sending sequences corresponding to the uplink control channel on the time domain symbol set corresponding to the time domain OCC are the same, and sending sequences corresponding to the sequence used by the SRS on the time domain symbol set corresponding to the time domain OCC are also the same.

In this example or the present application, the sequence consists of a symbol of information sent on the channel or signal before the information is multiplied by the time domain OCC. For example, multiple symbols on multiple REs on one time domain symbol before being multiplied by the OCC form one sequence.

EXAMPLE FIVE

In this example, the code domain information of the SRS hops once every F time domain symbols, where the code domain information includes at least one of the following: a time domain OCC index of the SRS, a sequence parameter, or a port index, where F is a positive integer greater than or equal to 1. The F time domain symbols include the SRS, that is, time domain symbols which do not include the SRS are not counted in the F. The sequence parameter is used for generating the sequence, and for example, when the SRS uses a Zadoff-Chu (ZC) sequence in the formula (1-1) or the formula (1-0) or a preset sequence, the sequence parameter includes at least one of the following parameters: a sequence group number u, a sequence number v, and a cyclic shift $n_{SRS}^{cs,i}$.

In one embodiment, the code domain information of the measurement reference signal is acquired according to first information, where the first information includes at least one of the following: an ID of a measurement reference signal resource in which the measurement reference signal is located, for example, Portindex=(SRSID)modeT, where SRSID represents the ID of the SRS resource in which the SRS is located; the number N of time domain symbols included in a time unit in which the measurement reference signal is located (for example, one slot includes 14 time domain symbols, that is, N=14, if one slot includes 12 time domain symbols, N=12, and of course, cases that one slot includes other numbers of time domain symbols are not excluded in this example); a positive integer M; the number L of time domain symbols occupied by the measurement reference signal in one time unit, where for example, L is the number of time domain symbols occupied by the measurement reference signal in one slot, and belongs to {1, 2, 4}; index information $l_2$ of a time domain symbol, in which the measurement reference signal is located, in N time domain symbols included in one time unit; index information $l_1$ of a time domain symbol, in which the measurement reference signal is located, in M preset time domain symbols; index information $l_0$ of the measurement reference signal in the L time domain symbols; a frame number of a frame in which the measurement reference signal is located; the number B of time units included in the frame in which the measurement reference signal is located; a time unit index acquired according to a subcarrier spacing of a BWP in which the measurement reference signal is located; a random sequence with a length of D; a virtual cell number $n_{ID}^{SRS}$; a frequency domain repeated sending parameter R corresponding to the measurement reference signal; a sequence repetition parameter R5 corresponding to the measurement reference signal; or F.

In one embodiment, the index information $l_i$, i=1, 2 may be obtained through the following formula: $l_i = l_i^{start} + l'$, where $l_2^{start}$ is index information of a starting time domain symbol, occupied by the measurement reference signal in a time unit, in the time unit, $l_1^{start}$ is index information of the starting time domain symbol occupied by the measurement reference symbol in the preset M time domain symbols, and l'=0, 1, ..., L−1 is index information of the time domain symbol occupied by the measurement reference signal in the L time domain symbols. For example, when one SRS port or one SRS resource occupies four time domain symbols whose indexes are {9, 10, 11, 12} in one slot, $l_2^{start}$ is 9, and $l_1^{start}$ is 1, where it is assumed that the M preset time domain symbols are time domain symbols whose indexes are {8, 9, 10, 11, 12, 13} in one slot, that is, the M preset time domain symbols are the last six time domain symbols in one slot. In this case, l'=0, 1, 2, 3.

M satisfies the following condition: M is less than or equal to N and is greater than or equal to A, where A is the maximum number of time domain symbols allowed to be occupied by the measurement reference signal in one time unit. For example, the SRS in NR may occupy last six time domain symbols in one slot, that is, A is 6 or M is 6, or A is the number of time domain symbols occupied by the measurement reference signal in one time unit. For example, time domain symbols occupied by one SRS resource in one slot belong to {1, 2, 4}, that is, A belongs to {1, 2, 4}. The frequency domain repeated sending parameter R represents that frequency domain resources occupied by the measurement reference signal on R time domain symbols in one time unit are not changed, where the frequency domain resources include at least one of the following: PRB resources, or REs (also referred to as subcarriers) in PRBs. For example, PRBs occupied by the measurement reference signal on R time domain symbols are the same, but subcarriers in PRBs occupied by the measurement reference signal may be different; or PRBs occupied by the measurement reference signal on R time domain symbols are the same, and subcarriers in PRBs occupied by the measurement reference signal may also be the same. Alternatively, the frequency domain repeated sending parameter R represents that frequency domain resources corresponding to the measurement reference signal hop after R time domain symbols occupied by the measurement reference signal, where the R time domain symbols may be located in one slot, or may be located in multiple slots.

In one embodiment, the time domain OCC index or the port index used by the SRS is acquired through the following formulas.

$$Portindex = \left(w_0 + \sum_{i=0}^{D_1-1} c(D_1 g(X) + i) 2^i \right) \bmod T$$

$$Portindex = \left(w_0 + \sum_{i=0}^{D_1-1} c(D_1 \lfloor g(X)/F \rfloor + i) 2^i \right) \bmod T$$

In the above formulas, g(X) is a function with respect to X; X is the first information; Portindex represents the port index corresponding to the measurement reference signal or the time domain OCC corresponding to the measurement reference signal; T is one of the following information: the length of the time domain OCC, the total number of time domain OCCs available to the SRS, the total number of different ports of the SRS, the frequency domain repeated sending parameter R of the measurement reference signal, and the sequence repetition parameter R5 of the measurement reference signal; c(z) represents the z-th value of a randomized sequence; $w_0 \in \{0, 1, \ldots T-1\}$ is a predetermined value, or $w_0$ is included in the received signaling information; $D_1$ is an integer greater than or equal to 1, for example $D_1$=8; F is R, or is R5, or is the smaller of R and R5.

Similarly, the cyclic shift parameter (the cyclic shift parameter is α in formula (1-1) or formula (1-0), for example, $$\alpha_i = 2\pi \frac{n_{SRS}^{cs,i}}{n_{SRS}^{cs,max}}$$

of an i-th measurement reference signal port) of the SRS may also changes over time. For example, the cyclic shift $n_{SRS}^{cs,i}$ corresponding to the SRS is acquired through one of the following formulas.

$$n_{SRS}^{cs,i} = \left(n_{SRS}^{cs} + \frac{n_{SRS}^{cs,max} p_i}{N_{ap}^{SRS}} + \sum_{i=0}^{D_2-1} (c(D_2 g(X) + i) 2^i) \right) \bmod n_{SRS}^{cs,max}, i = \quad (3-1)$$
$$0, 1, \ldots, N_{ap}^{SRS} - 1$$

$$n_{SRS}^{cs,i} = \left(n_{SRS}^{cs} + \frac{n_{SRS}^{cs,max} p_i}{N_{ap}^{SRS}} + \sum_{i=0}^{D_2-1} (c(D_2 \lfloor g(X)/F \rfloor + i) 2^i) \right) \bmod n_{SRS}^{cs,max}, i = \quad (3-2)$$
$$0, 1, \ldots, N_{ap}^{SRS} - 1$$

The sequence group number u is acquired through one of the following formulas.

$$u = \left(f_{gh}\left(\left(\sum_{i=0}^{D_3-1} c(D_3 g(X) + i) 2^i \right) \right) \bmod C + f_{ss} \right) \bmod C$$

$$u = \left(f_{gh}\left(\left(\sum_{i=0}^{D_3-1} c(D_3 \lfloor g(X)/F \rfloor + i) 2^i \right) \right) \bmod C + f_{ss} \right) \bmod C$$

The sequence number v is acquired through one of the following formulas.

$v = c(g(X))$ $v = c(\lfloor g(X)/F \rfloor)$

In the above formulas, g(X) is a function with respect to X; X is the first information; $N_{ap}^{SRS}$ is the number of measurement reference signal ports included in one SRS resource; $n_{SRS}^{cs,max}$ is an agreed value, represents the maximum number of cyclic shifts or the total number of available different cyclic shifts, and belongs to {8, 12} or {8, 24}; $p_i \in \{0, 1, \ldots N_{ap}^{SRS}\}$; and c(z) is the z-th value of one randomized sequence; $n_{SRS}^{cs} \in \{0, 1, \ldots n_{SRS}^{cs,max}-1\}$ is a predetermined value, or $n_{SRS}^{cs}$ is included in the received signaling information; $D_2$ is an integer greater than or equal to 1; C is the total number of sequence groups, for example, 30; and $f_{ss}$ is acquired according to the agreed rule and/or the parameter included in received signaling information, for example, $f_{ss}=n_{ID}^{SRS} \mod C$.

F is equal to R, or F is equal to R5, or F is equal to a smaller one of R and R5. In one embodiment, the sequence group number u, the sequence number v and the cyclic shift $n_{SRS}^{cs,i}$ may correspond to different Fs, or may correspond to the same F.

For example, c(z) is a PN sequence, whose initial value is a function with respect to $n_{ID}^{SRS}$.

In one embodiment, the g(X) is one of the following formulas.

$$g(l_1,M,n_s)=l_1+n_s*M$$

$$g(l_1,M,n_s,n_f)=l_1+n_s*M+B*n'_f*M$$

$$g(l_2,N,n_s)=l_2+n_s*N$$

$$g(l_2,N,n_s,n_f)=l_2+n_s*N+B*n'_f*N$$

$$g(l_0,L,n_s)=l_0+n_s*L$$

$$g(l_0,N,n_s,n_f)=l_0+n_s*N+B*n'_f*N$$

$$g(l_1,M,n_s,F)=\lfloor l_1/F \rfloor+n_s*M/F$$

$$g(l_1,M,n_s,n_f,F)=\lfloor l_1/F \rfloor+(n_s*M+B*n'_f*M)/F$$

$$g(l_2,N,n_s,F)=\lfloor l_2/F \rfloor+n_s*N/F$$

$$g(l_2,N,n_s,n_f,r)=\lfloor l_2/r \rfloor+(n_s*N+B*n'_f*N)/r$$

$$g(l_0,L,n_s,F)=\lfloor l_0/r \rfloor+n_s*L/F$$

$$g(l_0,N,n_s,n_f,F)=\lfloor l_0/F \rfloor+(n_s*N+B*n'_f*N)/F$$

In the above formulas, $n'_f=n_f$ or $n'_f=n_f \mod (E)$, $n_f$ is a frame number of a frame in which the reference signal is located, and E is a predetermined value.

EXAMPLE SIX

In this example, the terminal determines a parameter of a measurement reference signal according to an agreed restriction condition, and transmits the measurement reference signal using the parameter.

In one embodiment, the parameter is a frequency hopping parameter of the SRS.

In one embodiment, the SRS is a measurement reference signal triggered by physical layer dynamic signaling, and is, for example, an aperiodic SRS.

In one embodiment, the predetermined restriction condition is at least one of the following conditions.

Figure 14:
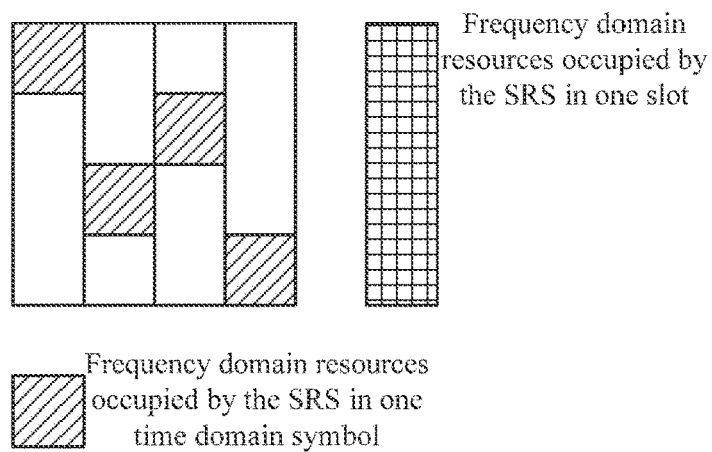
FIG. 14 is a schematic diagram illustrating a frequency domain location occupied by an SRS in one slot being a union set of frequency domain locations occupied by the SRS in multiple time domain symbols in one slot according to the present disclosure.

The condition one is as follows: the frequency domain resources occupied by the measurement reference signal in one slot are consecutive. FIG. 14 is a schematic diagram illustrating a frequency domain location occupied by an SRS in one slot being a union set of frequency domain locations occupied by the SRS in multiple time domain symbols in one slot according to the present disclosure. As shown in FIG. 14, one SRS resource occupies four time domain symbols in one slot. Frequency domain resources occupied in respective time domain symbols are different. For example, frequency domain PRBs occupied in respective time domain symbols are different. Thus, the frequency domain resources occupied by the SRS in one slot are a union set of frequency domain resources occupied by the SRS in four time domain symbols. As shown in FIG. 14, this restriction condition is that frequency domain resources occupied by the SRS in one slot are consecutive, no inconsecutive frequency band exists in the frequency domain resources, and the frequency domain resources take PRBs as a unit.

The condition two is as follows: frequency domain subcarriers occupied by the measurement reference signal in one time unit are evenly distributed on the frequency domain resources occupied by the measurement reference signal in one time unit.

Figure 15A:
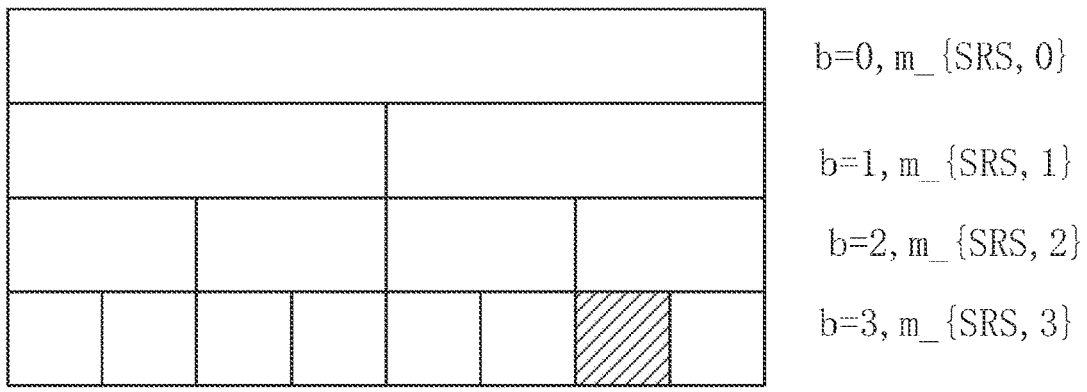
FIG. 15a is a schematic diagram illustrating one bandwidth in third-level bandwidths in an SRS tree structure according to the present disclosure.
Figure 15B:
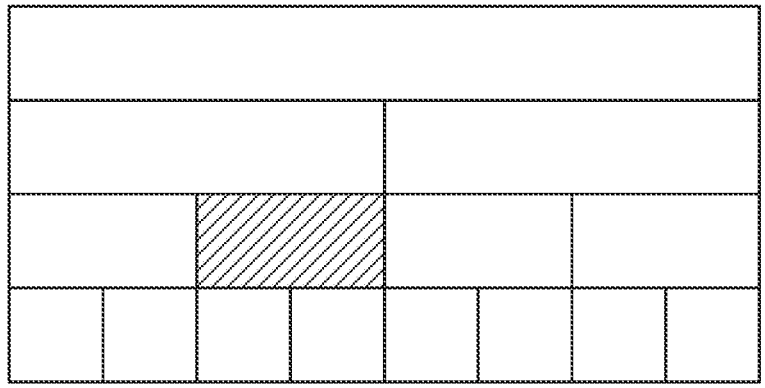
FIG. 15b is a schematic diagram illustrating one bandwidth in second-level bandwidths in an SRS tree structure according to the present disclosure.
Figure 16A:
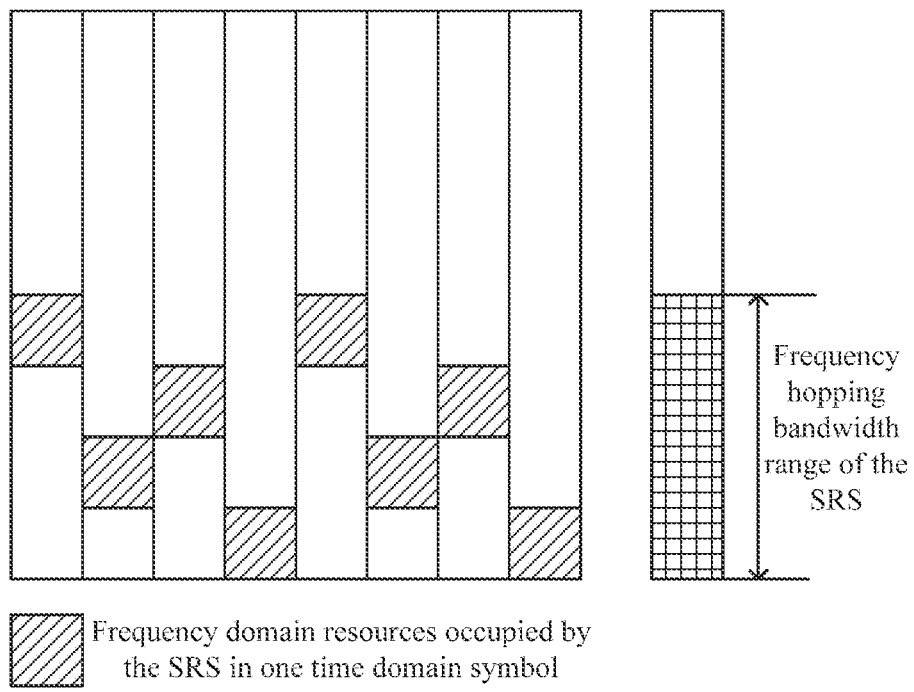
FIG. 16a is a schematic diagram illustrating a frequency hopping bandwidth level $b_{hop}=1$ according to the present disclosure.

The condition three is as follows: frequency domain resources occupied by the measurement reference signal in one time unit are a frequency hopping bandwidth, where the frequency hopping bandwidth is determined through the parameter $b_{hop}$. FIG. 15a is a structural diagram illustrating one bandwidth in third-level bandwidths in an SRS tree structure according to the present disclosure. As shown in FIG. 15a, the bandwidth of the SRS is represented by a tree-like structure, or a tree is referred to as a multilevel bandwidth structure. In the tree structure, one n-th level bandwidth includes one or more (n+1)-th level bandwidths. As shown in FIG. 15a, the bandwidth at an upper level includes two bandwidths at a lower level. As shown in FIG. 15a, for a bandwidth represented by the shadow part in the figure, corresponding bandwidth indexes in bandwidths of respective levels of b=0, 1, 2, 3 are 0, 1, 1, 0, respectively. FIG. 15b is a structural diagram illustrating one bandwidth in second-level bandwidths in an SRS tree structure according to the present disclosure. For one bandwidth represented by the shadow part in FIG. 15b, corresponding bandwidth indexes in bandwidths of respective levels of b=0, 1, 2 are 0, 0, 1, respectively. The frequency hopping bandwidth parameter $b_{hop}$ is used for representing a frequency domain range of frequency hopping of the SRS, that is, the union set of the frequency domain locations occupied by the SRS in each time domain symbol belongs to one bandwidth of $b_{hop}$-level bandwidths. Alternatively, the frequency hopping bandwidth level set of the SRS obtained for the frequency hopping bandwidth parameter $b_{hop}$ may also be referred to as $\{b_{hop}+1, b_{hop}+2, \ldots, B_{SRS}\}$. FIG. 16a is a schematic diagram illustrating a frequency hopping bandwidth level $b_{hop}=1$ according to the present disclosure, and FIG. 16a is a schematic diagram illustrating a frequency hopping bandwidth level $b_{hop}=2$ according to the present disclosure.

The condition four is as follows: frequency domain resources occupied by the measurement reference signal in one time unit are a BWP.

Figure 16B:
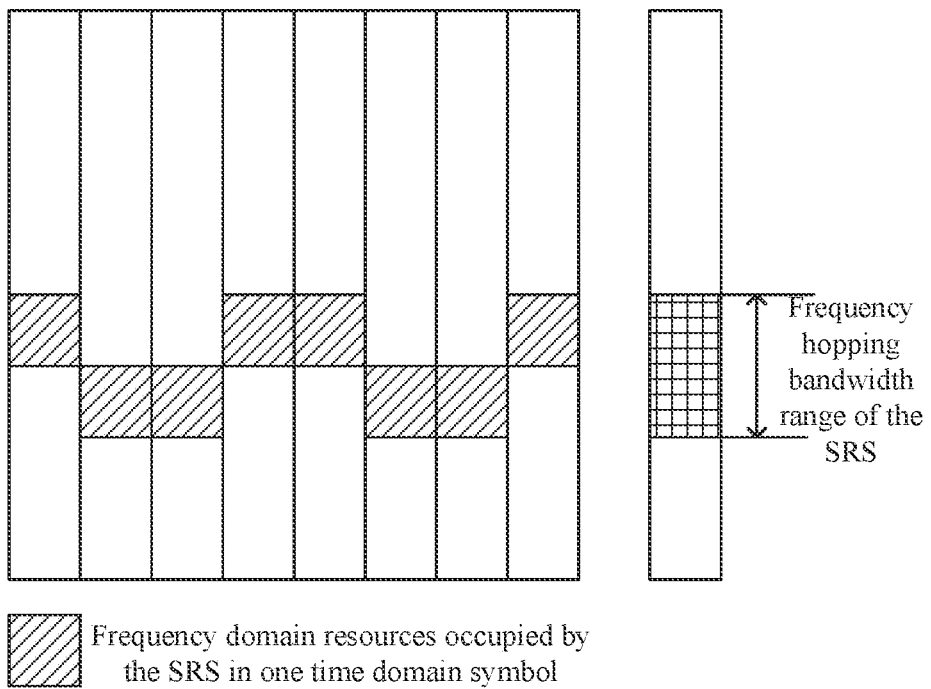
FIG. 16b is a schematic diagram illustrating a frequency hopping bandwidth level $b_{hop}=2$ according to the present disclosure.

The condition five is as follows: frequency domain resources occupied by the measurement reference signal in one time unit are a maximum bandwidth in the multilevel bandwidth structure. For example, frequency domain resources occupied by the measurement reference signal in one slot is one bandwidth determined through $m_{SRS,0}$, where one bandwidth corresponding to $m_{SRS,0}$ is as shown in FIG. 16a or FIG. 16b, or may be a bandwidth corresponding to the maximum bandwidth in the tree structure.

The condition six is as follows: a frequency hopping bandwidth level of the measurement reference signal is an agreed value, for example, $b_{hop}=0$ corresponding to an aperiodic measurement reference signal.

The condition six is as follows: the parameter of the measurement reference signal satisfies the following formula:

$$\sum_{b \in b_{hopA}} N_b = \frac{N_s}{R} \text{ or } \sum_{b \in b_{hopA}} N_b < \frac{N_s}{R},$$

where b is bandwidth level information in the multilevel bandwidth structure; $b_{hopA}$ is a frequency hopping bandwidth level set, that is, in the tree structure, the bandwidth index of the SRS changes over time in a bandwidth level belonging to $b_{hopA}$, and does not change over time in a bandwidth level which does not belong to $b_{hopA}$; $N_s$ is the number of time domain symbols occupied by the measurement reference signal in one time unit; R is the frequency domain repeated sending parameter of the measurement reference signal. The multilevel bandwidth structure includes multiple bandwidth levels, one bandwidth in (b−1)-th level bandwidths includes $N_b$ bandwidths in b-th level bandwidths. As shown in FIGS. 16a and 16b, $N_0=1$, $N_1=2$, $N_2=2$, $N_3=2$. The bandwidth index occupied by the measurement reference signal in a frequency hopping bandwidth level changes over time. In one embodiment, the frequency domain staring location $k_0$ occupied by the SRS may be obtained through the following formula:

$$k_0 = \bar{k}_0 + \sum_{b=0}^{B_{SRS}} K_{TC} M_{sc,b}^{SRS} n_b,$$

where $\bar{k}_0 = n_{shift} N_{sc}^{RB} + k_{TC}$, $n_{shift}$ is a parameter configured by a higher layer, $k_{TC}$ is an index of a comb in which the SRS is located when the SRS is transmitted in an IFDMA manner, $k_{TC}$ is the total number of combs of the SRS when the SRS is transmitted in an IFDMA manner.

$$n_b = \begin{cases} \lfloor 4n_{RRC}/m_{SRS,b} \rfloor \bmod N_b & b \notin b_{hopA} \\ \{F_b(n_{SRS}) + \lfloor 4n_{RRC}/m_{SRS,b} \rfloor\} \bmod N_b & \text{otherwise} \end{cases}$$

$$F_b(n_{SRS}) = \begin{cases} (N_b/2) \left\lfloor \frac{n_{SRS} \bmod \prod_{b' \in b_{hopA}, b' \leq b}^{b} N_{b'}}{\prod_{b' \in b_{hopA}, b' < b} N_{b'}} \right\rfloor + \text{if } N_b \text{ even} \\ \left\lfloor \frac{n_{SRS} \bmod \prod_{b' \in b_{hopA}, b' \leq b}^{b} N_{b'}}{2 \prod_{b' \in b_{hopA}, b' < b} N_{b'}} \right\rfloor \\ \lfloor N_b/2 \rfloor \lfloor n_{SRS}/\prod_{b' \in b_{hopA}, b' < b} N_{b'} \rfloor & \text{if } N_b \text{ odd} \end{cases}$$

$$n_{SRS} = \left( \frac{N_{slot}^{frame,\mu} n_f + n_{s,f}^{\mu} - T_{offset}}{T_{SRS}} \right) \cdot \left( \frac{N_{symb}^{SRS}}{R} \right) + \left\lfloor \frac{l'}{R} \right\rfloor$$

It can be seen from the above formulas that when the bandwidth level belongs to $b_{hopA}$, the bandwidth index $n_b$ corresponding to the SRS in this bandwidth level changes over time; and when the bandwidth level does not belong to $b_{hopA}$, the bandwidth index $n_b$ corresponding to the SRS in this bandwidth level does not change over time, where $n_{RRC}$ is a parameter configured by a higher layer.

In one embodiment, when $N_b$ is equal to 1, the bandwidth index $n_b$ does not change over time, which may be an exception of the bandwidth index $n_b$ changing over time. In one embodiment, when the frequency hopping bandwidth is $\{b_{hop}+1, b_{hop}+2, \ldots, B_{SRS}\}$, the above formulas may be updated to the following formulas.

$$n_b = \begin{cases} \lfloor 4n_{RRC}/m_{SRS,b} \rfloor \bmod N_b & b \leq b_{hop} \\ \{F_b(n_{SRS}) + \lfloor 4n_{RRC}/m_{SRS,b} \rfloor\} \bmod N_b & \text{otherwise} \end{cases}$$

$$F_b(n_{SRS}) = \begin{cases} (N_b/2) \left\lfloor \frac{n_{SRS} \bmod \prod_{b'=b_{hop}}^{b} N_{b'}}{\prod_{b'=b_{hop}}^{b-1} N_{b'}} \right\rfloor + \text{if } N_b \text{ even} \\ \left\lfloor \frac{n_{SRS} \bmod \prod_{b'=b_{hop}}^{b} N_{b'}}{2 \prod_{b'=b_{hop}}^{b-1} N_{b'}} \right\rfloor \\ \lfloor N_b/2 \rfloor \lfloor n_{SRS}/\prod_{b' \in b_{hop}}^{b-1} N_{b'} \rfloor & \text{if } N_b \text{ odd} \end{cases}$$

In the above formulas, when $b'=b_{hop}$, $N_{b'}$ is fixed to $N_{b'}=1$.

$$n_{SRS} = \left( \frac{N_{slot}^{frame,\mu} n_f + n_{s,f}^{\mu} - T_{offset}}{T_{SRS}} \right) \cdot \left( \frac{N_{symb}^{SRS}}{R} \right) + \left\lfloor \frac{l'}{R} \right\rfloor$$

Since the configuration parameter of the SRS is required to satisfy $$\sum_{b \in b_{hopA}} N_b \leq \frac{N_s}{R},$$

only first parameter set information of the SRS may be configured, and second parameter set information may be obtained according to parameter configuration in the first parameter set information and a restriction condition $$\sum_{b \in b_{hopA}} N_b \leq \frac{N_s}{R}.$$

For example, for five parameters ($C_{SRS}$, $B_{SRS}$, $b_{hopA}$, $N_s$, R), only part of parameters may be configured, and other parameters are obtained according to the configured parameters and $$\sum_{b \in b_{hopA}} N_b \leq \frac{N_s}{R}.$$

For example, when ($C_{SRS}$, $B_{SRS}$, $N_s$, R) are configured, the terminal further obtains $b_{hopA}$ according to $$\sum_{b \in b_{hopA}} N_b \leq \frac{N_s}{R},$$

or when ($C_{SRS}$, $B_{SRS}$, $b_{hopA}$, R) are configured, the terminal further obtains $N_s$ according to $$\sum_{b \in b_{hopA}} N_b \leq \frac{N_s}{R},$$

or when ($C_{SRS}$, $b_{hopA}$, $N_s$, R) are configured, the terminal further obtains $B_{SRS}$ according to $$\sum_{b \in b_{hopA}} N_b \leq \frac{N_s}{R}.$$

For the restriction condition $$\sum_{b \in b_{hopA}} N_b \leq \frac{N_s}{R},$$

when $b_{hopA} = \{b_{hop}+1, b_{hop}+2, \ldots, B_{SRS}\}$, this restriction condition may be updated to:

$$\sum_{b=b_{hop}+1}^{B_{SRS}} N_b = \frac{N_s}{R} \text{ or}$$

$$\sum_{b=b_{hop}+1}^{B_{SRS}} N_b \leq \frac{N_s}{R},$$

or this formula may be equivalent to $$\sum_{b=b_{hop}}^{B_{SRS}} N_b \leq \frac{N_s}{R}.$$

For $b=b_{hop}$, $N_b$ is fixed to $N_b=1$, and in this case, only $b_{hop}$ in parameters $b_{hopA}$ needs to be known. In a word, the second parameter set of the SRS is determined according to the first parameter set of the SRS and the predetermined restriction condition. The first parameter set and/or the second parameter set satisfy at least one of the following: the first parameter set is included in received signaling information; the second parameter set is not included in the received signaling information; the second parameter set includes bandwidth information occupied by the measurement reference signal on one time domain symbol, for example, $B_{SRS}$; and an intersection set of the first parameter set and the second parameter set is empty. The first parameter set include one of the following parameters: an index of a multilevel bandwidth structure, for example, $C_{SRS}$, where $C_{SRS}$ represents one structure selected from multiple tree structures; bandwidth level information occupied by the measurement reference signal in one time unit, for example, $B_{SRS}$; frequency hopping bandwidth level information of the measurement reference signal, for example, $b_{hopA}$ or $b_{hop}$ described above; information of the number of time domain symbols occupied by the measurement reference signal in one time unit, for example, $N_s$; or a repeated sending parameter of the measurement reference signal in one time unit, for example, R. The second parameter set includes at least one of the following parameters: an index of a multilevel bandwidth structure, for example, $C_{SRS}$, where $C_{SRS}$ represents one structure selected from multiple tree structures; bandwidth level information occupied by the measurement reference signal on one time domain symbol, for example, $b_{SRS}$; frequency hopping bandwidth level information of the measurement reference signal, for example, $b_{hopA}$ or $b_{hop}$ described above; information about the number of time domain symbols occupied by the measurement reference signal in one time unit, for example, $N_S$; and a repeated sending parameter of the measurement reference signal in one time unit, for example R.

In one embodiment, if multiple second parameter values are obtained according to the first parameter set of the SRS and the predetermined restriction condition, that is, multiple second parameter values satisfy the restriction condition, one of the second parameter values is selected from the multiple second parameter values according to an agreed rule. For example, a minimum value or a maximum value is selected from the multiple second parameter values.

In one embodiment, the terminal and the base station agree that the parameter configuration of the SRS satisfies the agreed condition, or the terminal is not expected to receive the SRS parameter configuration that does not satisfy the agreed condition. If the terminal receives the SRS parameter configuration that does not satisfy the agreed condition, the terminal considers that the control information is an error, or the terminal does not send the SRS. Alternatively, if the terminal receives the SRS parameter configuration that does not satisfy the agreed restriction condition, the terminal sends preset indication information to a higher layer or the base station.

EXAMPLE SEVEN

In this example, the total number of available cyclic shifts of the SRS will be described. For example, for $n_{SRS}^{cs,max}$ in the formula (3-1) or (3-2), when the total number of combs of the IFDMA is four, $n_{SRS}^{cs,max}=12$; when the total number of combs of the IFDMA is two, $n_{SRS}^{cs,max}24$; or when the total number of combs of the IFDMA is two, $n_{SRS}^{cs,max}$ belongs to {8, 24}, where {8, 24} are obtained through signaling information or the agreed rule. The total number of combs of the IFDMA is $2^\delta$, where $\delta$ is $2^\delta$ in a SRS length determination parameter $M_{SC}^{RS}=mN_{SC}^{RB}/2^\delta$ in the formula (1-0) or (1-1).

EXAMPLE EIGHT

In this example, the PTRS has an association with the SRS.

In one embodiment, when the time domain OCC of the SRS received by the terminal is enabled, or when the time domain OCC of the SRS belongs to a predetermined set, the terminal does not send the PTRS.

Alternatively, when the terminal is configured to send the PTRS under a predetermined condition (for example, a modulation order of a physical uplink shared channel (PUSCH) is greater than a predetermined value), the time domain OCC of the SRS is disabled, or the time domain OCC of the SRS belongs to the predetermined set.

Through the solution in the above example, the uplink SRS adopts the time domain OCC so that the coverage of the uplink measurement reference signal is not affected while the capacity of the measurement reference signal in a cell is increased. Moreover, the problem of non-orthogonality caused by two SRSs partially overlapping in frequency domain when the SRSs are transmitted based on the ZC sequence can be solved. In addition, the time domain OCC is allowed to be associated with the relationship between the SRS and the time domain symbol in the present application.

Therefore, the time domain OCC, the cyclic shift parameter or the port index of the measurement reference signal changes over time, which reduces the signaling information, reduces the inter-cell interference, and increases the capacity of the measurement reference signal in the cell to a certain extent.

The frequency hopping bandwidth of the measurement reference signal must satisfy a certain constraint condition so that the terminal obtains parameter information of the measurement reference signal according to the restriction condition.

From the description of the embodiments described above, it will be apparent to those skilled in the art that the method of any embodiment described above may be implemented by means of software plus a general-purpose hardware platform, or may of course be implemented by hardware. Based on this understanding, the technical solutions of the present disclosure substantially, or the part contributing to the related art, may be embodied in the form of a software product. The computer software product is stored in a storage medium (such as a read-only memory (ROM)/random access memory (RAM), a magnetic disk or an optical disk) and includes several instructions for enabling a terminal device (which may be a mobile phone, a computer, a server, a network device or the like) to execute the method according to one or more embodiments of the present disclosure.

EXAMPLE NINE

This example provides a channel quality acquisition method of a measurement reference signal. The method includes the following steps.

A BWP is determined.

A hypothetical transmission parameter of a control channel is obtained according to a parameter of the BWP.

Channel quality information of the measurement reference signal is obtained according to the hypothetical transmission parameter of the control channel.

The parameter of the BWP or the transmission parameter includes at least one of the following parameters: subcarrier spacing, a cyclic prefix (CP) length, or a frequency domain location in a carrier frequency.

In one embodiment, the BWP information is determined in one of the following manners.

The BWP is determined according to a BWP in which frequency domain resources occupied by the measurement reference signal are located.

The BWP is determined according to BWP information in configuration information of the measurement reference signal.

The BWP is determined according to an agreed BWP, where the agreed BWP may be, for example, a default downlink BWP or an initial active BWP.

The BWP is determined according to a BWP in which control channel resources corresponding to the measurement reference signal are located.

In one embodiment, the measurement reference signal includes at least one of the following: a channel state information reference signal (CSI-RS), a demodulation reference signal (DMRS), a synchronization signals block (SSB), or a synchronization signal.

In one embodiment, for example, the terminal predicts and/or detects performance of beam transmission of a physical downlink control channel (PDCCH) using a CSI-RS resource by detecting the CSI-RS resource, and reports predetermined information to the base station when the performance is lower than a predetermined threshold. For example, when a block error ratio (BLER) of the PDCCH is predicted higher than 10%, the terminal reports beam recovery request information to the base station.

In order to obtain the predicted BLER of the PDCCH (also referred to as hypothetical PDCCH BLER), the transmission parameter of the PDCCH is hypothesized, where the transmission parameter includes at least one of the following parameters: subcarrier spacing, a CP length, or a frequency domain bandwidth in one carrier frequency. That is, the predicted BLER is obtained based on the hypothesis that the PDCCH uses the transmission parameter for transmission. In order to obtain the hypothetical transmission parameter of the PDCCH, a BWP may be first determined, and a parameter of the determined BWP is then used as the hypothetical transmission parameter of the PDCCH.

The BWP is acquired in one of the following manners.

The BWP is acquired according to a BWP in which frequency domain resources occupied by the CSI-RS are located.

The BWP is acquired according to BWP information in configuration information of the CSI-RS. For example, one piece of BWP information may be configured in a CSI-RS resource setting in NR, which indicates a BWP in which all CSI-RS resources included in this CSI-RS resource setting are located, where one CSI-RS resource setting includes one or more CSI-RS resource sets and one CSI-RS resource set includes one or more CSI-RS resources.

The BWP is acquired according to an agreed BWP, where the agreed BWP may be, for example, a default downlink BWP configured in NR or an initial active BWP.

The BWP is acquired according to a BWP in which control channel resources corresponding to the measurement reference signal are located. For example, the CSI-RS has a qual-co-location (QCL) relationship with a DMRS of control resource set (CORESET) 1. The hypothetical transmission parameter of the PDCCH is obtained by the parameter of BWP in which CORESET1 is located.

The CP length may also be referred to as CP type.

EMBODIMENT TWO

The embodiment further provides a device for transmitting a measurement reference signal. The device is configured to implement the above-mentioned embodiments. What has been described will not be repeated. As used below, the term "module" may be software, hardware or a combination thereof capable of implementing predetermined functions. The devices described below in the embodiments may be implemented by software, but implementation by hardware or by a combination of software and hardware is also possible and conceived.

Figure 17:
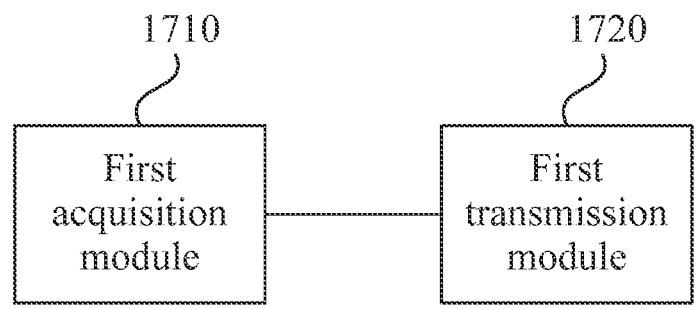
FIG. 17 is a structural diagram of a device for transmitting a measurement reference signal according to an embodiment of the present disclosure.

According to an embodiment of the present disclosure, a device for transmitting a measurement reference signal is provided. As shown in FIG. 17, the device includes a first acquisition module 1710 and a first transmission module 1720.

The first acquisition module 1710 is configured to acquire port information corresponding to a measurement reference signal according to at least one of received signaling information or an agreed rule.

The first transmission module 1720 is configured to transmit the measurement reference signal according to the port information.

The port information includes at least one of the following: a time domain OCC index corresponding to the measurement reference signal, a length of a time domain OCC corresponding to the measurement reference signal, or a port index of the measurement reference signal. In one embodiment, the transmitting described above includes sending or receiving.

Through the above steps, port information corresponding to a measurement reference signal is acquired according to received signaling information and/or an agreed rule, and the measurement reference signal is transmitted according to the port information, where the port information includes at least one of the following: a time domain OCC index corresponding to the measurement reference signal, a length of a time domain OCC corresponding to the measurement reference signal, or a port index of the measurement reference signal. Through the above solution, the problem of the lack of a solution for determining a measurement reference signal in NR in the related art is solved, and a solution for determining a measurement reference signal suitable to NR is proposed.

In one embodiment, the port information includes at least one of the following features: port indexes of different measurement reference signals correspond to different time domain OCCs; measurement reference signal ports included in one measurement reference signal resource share one time domain OCC; one measurement reference signal resource corresponds to one time domain OCC; or port indexes of measurement reference signals corresponding to two measurement reference signal resources including the same number of ports are different.

In one embodiment, the first acquisition module 1710 is configured to execute at least one of the following steps: acquiring the port information according to an ID of a measurement reference signal resource in which the measurement reference signal is located; acquiring the port information according to an ID of a measurement reference signal resource set in which the measurement reference signal is located; acquiring the port information according to configuration information of the measurement reference signal resource set in which the measurement reference signal is located; acquiring the port information according to identification information of a communication node transmitting measurement reference information (for example, in response to the communication node being a terminal, the identification information of the terminal may be a C-RNTI); or acquiring the port information according to a parameter generating a demodulation reference signal, where one measurement reference signal resource set includes at least one measurement reference signal resource, and one measurement reference signal resource includes at least one measurement reference signal port.

In one embodiment, the first acquisition module 1710 is configured to acquire the port information corresponding to the measurement reference signal according to at least one of pieces of the following information:

the number N of time domain symbols included in a time unit in which the measurement reference signal is located; a positive integer M; the number L of time domain symbols occupied by the measurement reference signal in one time unit; index information $l_2$ of a time domain symbol, in which the measurement reference signal is located, in N time domain symbols included in one time unit; index information $l_1$ of a time domain symbol, in which the measurement reference signal is located, in M preset time domain symbols; index information $l_0$ of the measurement reference signal in the L time domain symbols; a frame number of a frame in which the measurement reference signal is located; the number B of time units included in the frame in which the measurement reference signal is located; a time unit index acquired according to a subcarrier spacing of a BWP in which the measurement reference signal is located; a random sequence with a length of D; a virtual cell number $n_{ID}^{SRS}$; a frequency domain repeated sending parameter R corresponding to the measurement reference signal; or a sequence repetition parameter R5 corresponding to the measurement reference signal, where B, D, L, N, M and L are positive integers.

M satisfies the following condition: M is less than or equal to N and is greater than or equal to A, where A is the maximum number of time domain symbols allowed to be occupied by the measurement reference signal in one time unit, or A is the number of time domain symbols occupied by the measurement reference signal in one time unit.

The frequency domain repeated sending parameter R represents that the measurement reference signal hops once in frequency domain every R time domain symbols; the sequence repetition parameter R5 represents that the measurement reference signal hops once in sequence or sequence parameter every R5 time domain symbols; and the R time domain symbols or the R5 time domain symbols include the measurement reference signal; where both R and R5 are positive integers.

In one embodiment, the index information $l_i$, i=1, 2 may be obtained through the following formula: $l_i = l_i^{start} + l'$, where $l_2^{start}$ is index information of a starting time domain symbol, occupied by the measurement reference signal in a time unit, in the time unit, $l_1^{start}$ is index information of the starting time domain symbol occupied by the measurement reference symbol in the preset M time domain symbols, and l'=0, 1, . . . , L−1 is index information of the time domain symbol occupied by the measurement reference signal in the L time domain symbols.

In one embodiment, the first acquisition module 1710 is configured to execute at least one of the following: including the port index of the measurement reference signal in the received signaling information; including the time domain OCC index corresponding to the measurement reference signal in the received signaling information; including the length of the time domain OCC corresponding to the measurement reference signal in the received signaling information; or including the port information of the measurement reference signal in the configuration information of the measurement reference signal resource set in which the measurement reference signal is located.

In one embodiment, the length of the time domain OCC includes at least one of the following:

the length of the time domain OCC corresponding to the measurement reference signal is less than or equal to the frequency domain repeated sending parameter R corresponding to the measurement reference signal;

the length of the time domain OCC corresponding to the measurement reference signal is less than or equal to the sequence repetition parameter R5 corresponding to the measurement reference signal;

the length of the time domain OCC includes a length 1;

the length of the time domain OCC has an association with a sequence parameter (in one embodiment, the sequence parameter is used for generating the sequence, and for example, the sequence parameter includes at least one of parameters: a sequence group number, a sequence number, and a cyclic shift) of the measurement reference signal (in one embodiment, having an association between the time domain OCC and the sequence parameter may refer to acquiring the latter according to the former, and may also refer to acquiring the former according to the latter);

the length of the time domain OCC has an association with the number of time domain symbols included in a sequence hopping unit of the measurement reference signal; or the length of the time domain OCC has an association with a first relationship, where the first relationship is a relationship between a sequence and a time domain symbol of the measurement reference signal.

The frequency domain repeated sending parameter R represents that the measurement reference signal hops once in frequency domain every R time domain symbols; the sequence repetition parameter R5 represents that the measurement reference signal hops once in sequence or sequence parameter every R5 time domain symbols; and the R time domain symbols or the R5 time domain symbols include the measurement reference signal.

R and R5 are positive integers.

In one embodiment, the length of the time domain OCC has the association with the sequence parameter of the measurement reference signal, and the association includes at least one of the following associations.

When the length of the time domain OCC is greater than 1, sequences corresponding to one measurement reference signal port on R1 time domain symbols are the same.

When the length of the time domain OCC is greater than 1, sequence group numbers corresponding to one measurement reference signal port on R1 time domain symbols are the same.

When the length of the time domain OCC is greater than 1, sequence numbers corresponding to one measurement reference signal port on R1 time domain symbols are the same.

When sequences corresponding to one measurement reference signal port on R1 time domain symbols are different, a length of a time domain OCC corresponding to the measurement reference signal port is 1.

When sequence parameters corresponding to one measurement reference signal port on R1 time domain symbols are different, the length of the time domain OCC corresponding to the measurement reference signal port is 1.

R1 at least satisfies one of the following features: R1 is less than or equal to R, R1 is the length of the time domain OCC, or R1 is less than or equal to N; and R1 time domain symbols include the measurement reference signal.

N is the number of time domain symbols included by the one measurement reference signal port in one time unit, and both R1 and N are positive integers.

In one embodiment, a time domain OCC set has an association with a sequence of the measurement reference signal.

In one embodiment, the association between the time domain OCC set and the sequence of the measurement reference signal includes at least one of the following: different time domain OCC sets correspond to different sequence generation modes of the measurement reference signal, or different sequence generation modes of the measurement reference signal correspond to different time domain OCC sets. The sequence generation mode corresponding to the measurement reference signal includes at least one of the following: sequences corresponding to one measurement reference signal port on R1 time domain symbols are the same; sequences corresponding to one measurement reference signal port on R1 time domain symbols are different; sequence parameters corresponding to one measurement reference signal port on R1 time domain symbols are the same; sequence parameters corresponding to one measurement reference signal port on R1 time domain symbols are different; symbols corresponding to the measurement reference signal on time domain symbols corresponding to time domain OCC codes on a same subcarrier are the same; or symbols corresponding to the measurement reference signal on time domain symbols corresponding to time domain OCC codes on a same subcarrier are different.

The sequence parameter is used for generating the sequence, and for example, the sequence parameter includes at least one of the following parameters: a sequence group number, a sequence number, or a cyclic shift; where R1 is a positive integer, and at least satisfies one of the following features: R1 is less than or equal to R, R1 is the length of the time domain OCC, or R1 is less than or equal to N; and R1 time domain symbols include the measurement reference signal.

N is the number of time domain symbols included by the one measurement reference signal port in one time unit.

The frequency domain repeated sending parameter R represents that the measurement reference signal hops once in frequency domain every R time domain symbols, and each of the R time domain symbols includes the measurement reference signal, where R is a positive integer. In one embodiment, the measurement reference signal hops once in frequency domain every R time domain symbols, and each of the R time domain symbols is a time domain symbol including a measurement reference signal. For example, each of time domain symbols with indexes 1, 5, 7 and 12 includes the measurement reference signal. It is assumed that the measurement reference signal hops once in frequency domain every three time domain symbols, then the measurement reference signal hops once in frequency domain after the time domain symbols 1, 5 and 7, instead of after the time domain symbols 1, 2, and 3, that is, time domain symbols which do not include the measurement reference signal are not counted in the R time domain symbols.

In one embodiment, the first transmission module 1720 is configured to execute at least one of the following: not allowing to transmit at least one of a PTRS and the measurement reference signal in the following case: the length of the time domain OCC corresponding to the measurement reference signal is greater than 1, or the time domain OCC corresponding to the measurement reference signal does not belong to a predetermined time domain OCC set, or the measurement reference signal corresponds to at least two different time domain OCCs.

The following two have an association: the length of the time domain OCC of the measurement reference signal, and whether to send the PTRS.

The following two have an association: whether the time domain OCC of the measurement reference signal is enabled, and whether the PTRS exists.

The following two have an association: the time domain OCC set of the measurement reference signal, and whether the PTRS exists.

Figure 18:
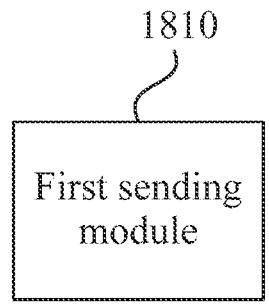
FIG. 18 is a structural diagram of a device for sending signaling information according to an embodiment of the present disclosure.

According to another embodiment of the present disclosure, a device for sending signaling information is provided. As shown in FIG. 18, the device includes a first sending module 1810.

The first sending module 1810 is configured to send signaling information, where the signaling information includes at least one of the following: information about a correspondence between a sequence parameter and a time domain symbol, or a time domain OCC corresponding to a time domain symbol set.

In one embodiment, the information about the correspondence between the sequence parameter and the time domain symbol includes at least one of the following: information about whether the sequence parameter changes on R2 time domain symbols; information about whether the sequence changes on R2 time domain symbols; the sequence hopping once every R3 time domain symbols; or the sequence parameter hopping once every R3 time domain symbols; where the sequence hopping once every R3 time domain symbols represents that all sequence parameters used for generating the sequence maintain unchanged in the R3 time domain symbols. Both R2 and R3 are integers.

In one embodiment, the sequence parameter is used for generating the sequence. For example, the sequence parameter includes at least one of the following parameters: a sequence group number, a sequence number, or a cyclic shift. For example, if the sequence group number hops once every four time domain symbols, and the sequence number and the cyclic shift hop once every two time domain symbols, the sequence hops once every two time domain symbols. Of course, the number of time domain symbols included in time domain hopping units of all sequence parameters may also be the same. The sequence parameter is used for generating the sequence, and for example, includes a sequence group number and/or a sequence number. The R2 time domain symbols include the measurement reference signal, and the R3 time domain symbols include the measurement reference signal. Alternatively, time domain symbols that do not include the measurement reference signal may exist in the R2 time domain symbols, and time domain symbols that do not include the measurement reference signal may exist in the R3 time domain symbols. The sequence is a sequence of a symbol to be transmitted on the channel or signal before being multiplied by the time domain OCC, where the symbol may be a modulation symbol or a reference signal symbol.

In one embodiment, R2 or R3 includes at least one of the following: R2 or R3 is less than or equal to a frequency domain repeated sending parameter R; R2 or R3 is less than or equal to a length of a time domain OCC corresponding to a channel or a signal; or R2 or R3 is less than or equal to N, where N is the number of time domain symbols included by a channel or a signal in one time unit, and the channel or the signal is a channel or a signal corresponding to the signaling information; where each of the R2 time domain symbols includes the channel or the signal; and each of the R3 time domain symbols includes the channel or the signal.

The frequency domain repeated sending parameter R represents that the measurement reference signal hops once in frequency domain every R time domain symbols, and each of the R time domain symbols includes the measurement reference signal, where R is a positive integer.

In one embodiment, the sequence is transmitted (sent or received) in at least one of the following: a control channel, a data channel, a measurement reference signal, or a demodulation reference signal.

In one embodiment, in a case where the signaling information includes a time domain OCC corresponding to a time domain symbol set, the following is further included:

Transmitting, on a channel or a signal corresponding to the signaling information, a symbol transmitted on a time domain symbol in the time domain symbol set after the symbol is multiplied by the time domain OCC; or when same symbols transmitted on multiple time domain symbols in the time domain symbol set (in one embodiment, the symbols are information transmitted before being multiplied by the time domain OCC on the channel or the signal), transmitting the symbols on the channel or the signal corresponding to the signaling information after the symbols are multiplied by the time domain OCC.

Figure 19:
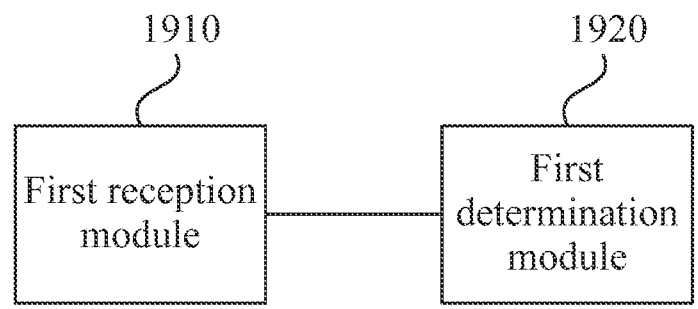
FIG. 19 is a structural diagram of a device for receiving signaling information according to an embodiment of the present disclosure.

According to another embodiment of the present disclosure, a device for receiving signaling information is provided. As shown in FIG. 19, the device includes a first reception module 1910 and a first determination module 1920.

The first reception module 1910 is configured to receive signaling information.

The first determination module 1920 is configured to determine at least one of the following according to the signaling information: information about a correspondence between a sequence parameter and a time domain symbol, or a time domain OCC corresponding to a time domain symbol set.

In one embodiment, the information about the correspondence between the sequence and the time domain symbol includes at least one of the following: information about whether the sequence parameter changes on R2 time domain symbols in one time unit; information about whether the sequence changes on R2 time domain symbols in one time unit; the sequence hopping once every R3 time domain symbols; or the sequence parameter hopping once every R3 time domain symbols; where R2 and R3 are integers, and the sequence parameter includes at least one of the following parameters: a sequence group number or a sequence number.

In one embodiment, R2 and/or R3 satisfy at least one of the following features: R2 and/or R3 are less than or equal to R, R2 and/or R3 are less than or equal to a length of a time domain OCC corresponding to a channel or a signal, or R2 and/or R3 are less than or equal to N, where N is the number of time domain symbols included by the channel or the signal in one time unit, and the channel or the signal is a channel or a signal corresponding to the signaling information. The frequency domain repeated sending parameter R represents that the measurement reference signal hops once every R time domain symbols in frequency domain, and the R time domain symbols include the measurement reference signal. R and R5 are positive integers.

In one embodiment, the sequence is transmitted in at least one of the following: a control channel, a data channel, a measurement reference signal, and a demodulation reference signal.

In one embodiment, in a case where the signaling information includes the time domain OCC corresponding to the time domain symbol set, one of the following features is satisfies: a symbol transmitted on a time domain in the time domain symbol set is transmitted on the channel or the signal corresponding to the signaling information after the symbol is multiplied by the time domain OCC, and in response to same symbols transmitted on multiple time domain symbols in the time domain symbol set, the symbols are transmitted on the channel or the signal corresponding to the signaling information after the symbols are multiplied by the time domain OCC.

Figure 20:
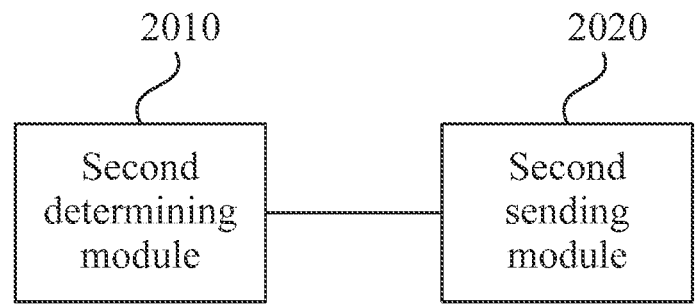
FIG. 20 is a structural diagram of another device for transmitting a measurement reference signal according to an embodiment of the present disclosure.

According to another embodiment of the present disclosure, a device for transmitting a measurement reference signal is further provided. As shown in FIG. 20, the device includes a second determining module 2010 and a second sending module 2020.

The second determining module 2010 is configured to determine code domain information corresponding to a measurement reference signal.

The second sending module 2020 is configured to send the measurement reference signal using the determined code domain information.

The code domain information includes at least one of the following: a time domain OCC index, a sequence parameter, or a port index.

The sequence parameter is used for generating a sequence, and the code domain information hops once every F time domain symbols, where F is a positive integer.

In one embodiment, the second determining module 2010 is configured to acquire the code domain information of the measurement reference signal according to first information, where the first information includes at least one of the following:

an ID of a measurement reference signal resource in which the measurement reference signal is located; the number N of time domain symbols included in a time unit in which the measurement reference signal is located; a positive integer M; the number L of time domain symbols occupied by the measurement reference signal in one time unit; index information $l_2$ of a time domain symbol, in which the measurement reference signal is located, in N time domain symbols included in one time unit; index information $l_1$ of a time domain symbol, in which the measurement reference signal is located, in M preset time domain symbols; index information $l_0$ of the measurement reference signal in the L time domain symbols; a frame number of a frame in which the measurement reference signal is located; the number B of time units included in the frame in which the measurement reference signal is located; a time unit index acquired according to a subcarrier spacing of a bandwidth part (BWP) in which the measurement reference signal is located; a random sequence with a length of D; a virtual cell number $n_{ID}^{SRS}$; a frequency domain repeated sending parameter R corresponding to the measurement reference signal; a sequence repetition parameter R5 corresponding to the measurement reference signal; and F, where B, D, L, N, M and L are integers.

M satisfies a following condition: M is less than or equal to N and is greater than or equal to A, where A is the maximum number of time domain symbols allowed to be occupied by the reference signal in one time unit, or A is the number of time domain symbols occupied by the reference signal in one time unit.

The frequency domain repeated sending parameter R (the frequency domain resource includes a frequency domain PRB and/or a frequency domain subcarrier) represents that the measurement reference signal hops once in frequency domain every R time domain symbols; the sequence repetition parameter R5 represents that the measurement reference signal hops once in sequence or sequence parameter every R5 time domain symbols; the R time domain symbols or the R5 time domain symbols include the measurement reference signal; and the F time domain symbols include the measurement reference signal.

R and R5 are positive integers.

In one embodiment, the index information $l_i$, i=1, 2 may be obtained through the following formula: $l_i = l_i^{start} + l'$, where $l_2^{start}$ is index information of a starting time domain symbol, occupied by the measurement reference signal in a time unit, in the time unit, $l_1^{start}$ is index information of the starting time domain symbol occupied by the measurement reference symbol in the preset M time domain symbols, and $l' = 0, 1, \ldots, L-1$ is index information of the time domain symbol occupied by the measurement reference signal in the L time domain symbols.

In one embodiment, the time domain OCC index or the port index of the measurement reference signal is acquired through one of the following formulas.

$$Portindex = \left(w_0 + \sum_{i=0}^{D_1-1} c(D_1 g(X) + i) 2^i\right) \mod T$$

$$Portindex = \left(w_0 + \sum_{i=0}^{D_1-1} c(D_1 \lfloor g(X)/F \rfloor + i) 2^i\right) \mod T$$

g(X) is a function with respect to X, and X includes the first information.

Portindex represents the port index corresponding to the measurement reference signal, or the time domain OCC index corresponding to the measurement reference signal.

T is one of pieces of the following information: a length of the time domain OCC, the total number of time domain OCCs available to the measurement reference signal, and the total number of port indexes of the measurement reference signal.

c(z) represents a z-th value of a randomized sequence, and z is a positive integer (in one embodiment, c(z) may be a PN random sequence).

$w_0 \in \{0, 1 \ldots T-1\}$ is an agreed value, or is obtained according to other parameters in an agreed rule, for example, $w_0 = f(n_{ID}^{SRS})$, where $n_{ID}^{SRS}$ is a physical cell number or is included in the received signaling information, or $w_0$ is included in the received signaling information.

$D_1$ is an integer greater than or equal to 1.

F is equal to R, or F is equal to R5, or F is equal to a smaller one of R and R5.

In one embodiment, the sequence parameter corresponding to the measurement reference signal is used for generating the sequence. For example, the sequence parameter includes at least one of the following parameters: a sequence group number, a sequence number, or a cyclic shift. The cyclic shift $n_{SRS}^{cs,i}$ is acquire through one of the following formulas.

$$n_{SRS}^{cs,i} = \left(n_{SRS}^{cs} + \frac{n_{SRS}^{cs,max} p_i}{N_{ap}^{SRS}} + \sum_{i=0}^{D_2-1} \left(c(D_2 g(X) + i) 2^i\right)\right) \mod n_{SRS}^{cs,max},$$

$$i = 0, 1, \ldots, N_{ap}^{SRS} - 1$$

$$n_{SRS}^{cs,i} = \left(n_{SRS}^{cs} + \frac{n_{SRS}^{cs,max} p_i}{N_{ap}^{SRS}} + \sum_{i=0}^{D_2-1} \left(c(D_2 \lfloor g(X)/F \rfloor + i) 2^i\right)\right) \mod n_{SRS}^{cs,max},$$

$$i = 0, 1, \ldots, N_{ap}^{SRS} - 1$$

The sequence group number u is acquired through one of the following formulas.

$$u = \left(f_{gh}\left(\left(\sum_{i=0}^{D_3-1} c(D_3 g(X) + i) 2^i\right)\right) \mod C + f_{ss}\right) \mod C$$

-continued $$u = \left(f_{gh}\left(\left(\sum_{i=0}^{D_3-1} c(D_3\lfloor g(X)/F\rfloor + i)2^i\right)\right) \bmod C + f_{ss}\right) \bmod C$$

The sequence number v is acquired through one of the following formulas.

$v=c(g(X))$ $v=c(\lfloor g(X)/F\rfloor)$ g(X) is a function with respect to X, and X includes the first information.

$N_{ap}^{SRS}$ is the number of measurement reference signal ports included in one measurement reference signal resource.

$n_{SRS}^{cs,max}$ is a conventional value, or is included in the received signaling information ($n_{SRS}^{cs,max}$ is the total number of cyclic shifts available for the measurement reference signal), $p_i \in \{0, 1, \ldots N_{ap}^{SRS}\}$, and c(z) represents a z-th value of a randomized sequence, where z is a positive integer (in one embodiment, c(z) may be a PN random sequence).

$n_{SRS}^{cs} \in \{0, 1, \ldots n_{SRS}^{cs,max}-1\}$ is a predetermined value, or $n_{SRS}^{cs}$ is included in the received signaling information.

$D_2$ and $D_3$ are integers greater than or equal to 1.

C is the total number of sequence groups.

$f_{ss}$ is acquired according to at least one of the following included parameters: an agreed rule, or received signaling information.

F is equal to R, or F is equal to R5, or F is equal to a smaller one of R and R5.

In one embodiment, the g(X) is one of the following formulas.

$g(l_1,M,n_s)=l_1+n_s*M$ $g(l_1,M,n_s,n_f)=l_1+n_s*M+B*n'_f*M$ $g(l_2,N,n_s)=l_2+n_s*N$ $g(l_2,N,n_s,n_f)=l_2+n_s*N+B*n'_f*N$ $g(l_0,L,n_s)=l_0+n_s*L$ $g(l_0,N,n_s,n_f)=l_0+n_s*N+B*n'_f*N$ $g(l_1,M,n_s,F)=\lfloor l_1/F\rfloor+n_s*M/F$ $g(l_1,M,n_s,n_f,F)=\lfloor l_1/F\rfloor+(n_s*M+B*n'_f*M)/F$ $g(l_2,N,n_s,F)=\lfloor l_2/F\rfloor+n_s*N/F$ $g(l_2,N,n_s,n_f,r)=\lfloor l_2/r\rfloor+(n_s*N+B*n'_f*N)/r$ $g(l_0,L,n_s,F)=\lfloor l_0/r\rfloor+n_s*L/F$ $g(l_0,N,n_s,n_f,F)=\lfloor l_0/F\rfloor+(n_s*N+B*n'_f*N)/F$ $n'_f=n_f$ or $n'_f=n_f \bmod(E)$, where $n_f$ is a frame number of a frame in which the reference signal is located, and E is a predetermined value.

F is equal to R, or F is equal to R5, or F is equal to a smaller one of R and R5.

Figure 21:
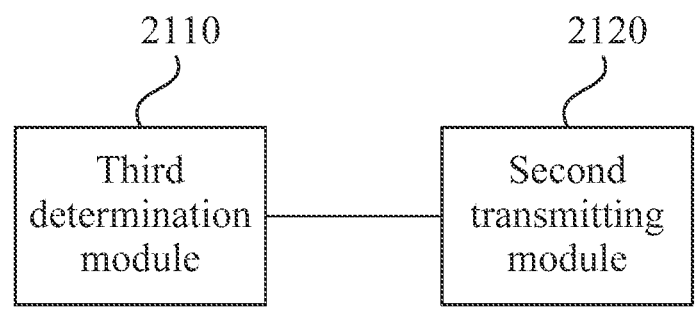
FIG. 21 is a structural diagram of still another device for transmitting a measurement reference signal according to an embodiment of the present disclosure.

According to another embodiment of the present disclosure, a device for transmitting a measurement reference signal is further provided. As shown in FIG. 21, the device includes a third determination module 2110 and a second transmitting module 2120.

The third determination module 2110 is configured to determine a parameter of a measurement reference signal according to an agreed restriction condition.

The second transmitting module 2120 is configured to transmit the measurement reference signal using the parameter of the measurement reference signal.

In one embodiment, the third determination module 2110 is configured to determine a frequency hopping parameter of the measurement reference signal according to the agreed restriction condition.

In one embodiment, the measurement reference signal is a measurement reference signal triggered by physical layer dynamic signaling, and thus may also be referred to as the aperiodic measurement reference signal.

In one embodiment, the parameter of the measurement reference signal includes a first parameter set and a second parameter set; where the second parameter set is determined according to the first parameter set and the restriction condition.

In one embodiment, the method satisfies at least one of the following features.

The first parameter set is included in received signaling information.

The second parameter set is not included in the received signaling information.

The second parameter set includes level information of a bandwidth occupied by the measurement reference signal on one time domain symbol.

An intersection set of the first parameter set and the second parameter set is empty. At least one of the first parameter set and the second parameter set includes one of the following: an index of a multilevel bandwidth structure, level information of a bandwidth occupied by the measurement reference signal on one time domain symbol, frequency hopping bandwidth level information of the measurement reference signal, information about the number of time domain symbols occupied by the measurement reference signal in one time unit, a repeated sending parameter of the measurement reference signal in one time unit, or a sequence repetition parameter of the measurement reference signal.

In one embodiment, the restriction condition includes at least one of the following conditions.

Frequency domain resources occupied by the measurement reference signal in one time unit are consecutive (being consecutive represents that PRBs occupied by the measurement reference signal in a union set of frequency domain resources occupied by the measurement reference signal are consecutive, and inconsecutive PRBs do not exist).

Frequency domain subcarriers occupied by the measurement reference signal in one time unit are evenly distributed on the frequency domain resources occupied by the measurement reference signal in one time unit.

Frequency domain resources occupied by the measurement reference signal in one time unit are a frequency hopping bandwidth.

Frequency domain resources occupied by the measurement reference signal in one time unit are a BWP.

Frequency domain resources occupied by the measurement reference signal in one time unit are a maximum bandwidth in the multilevel bandwidth structure.

A frequency hopping bandwidth level of the measurement reference signal is an agreed value.

The parameter of the measurement reference signal satisfies the following formula:

$$\sum_{b \in b_{hopA}} N_b$$

is less than or equal to $$\frac{N_s}{R}.$$

The parameter of the measurement reference signal satisfies the following formula:

$$\sum_{b=b_{hop}+1}^{B_{SRS}} N_b$$

is less than or equal to $$\frac{N_s}{R}.$$

In the above formulas, b is bandwidth level information in the multilevel bandwidth structure, $b_{hopA}$ is a frequency hopping bandwidth level set, $N_s$ is the number of time domain symbols occupied by the measurement reference signal in one time unit, R is a frequency domain repeated sending parameter of the measurement reference signal; where the multilevel bandwidth structure includes multiple bandwidth levels, one bandwidth in (b−1)-th level bandwidths includes $N_b$ bandwidths in b-th level bandwidths, an index of a bandwidth occupied by the measurement reference signal in a frequency hopping bandwidth level in the frequency hopping bandwidth level set varies over time; at least one of $b_{hop}$ or $B_{SRS}$ is a predetermined value, or at least one of $b_{hop}$ or $B_{SRS}$ is included in the received signaling information; and $b_{hop}$ and $B_{SRS}$ are nonnegative integers.

In one embodiment, in response to the frequency hopping bandwidth level set being $\{b_{hop}+1, b_{hop}+2, \ldots, B_{SRS}\}$; the restriction condition is:

the parameter of the measurement reference signal satisfies the following formula:

$$\sum_{b=b_{hop}+1}^{B_{SRS}} N_b$$

is less than or equal to $$\frac{N_s}{R}.$$

In the above formula, $b_{hop}$ is a predetermined value, or $b_{hop}$ is included in the received signaling information.

In one embodiment, in a case where a first communication node is a communication node transmitting the measurement reference signal, before the measurement reference signal is transmitted using the parameter of the measurement reference signal, at least one of the following steps is included.

The first communication node is not expected to receive measurement reference signal parameter configuration which does not satisfy the restriction condition (in one embodiment, not expected is a technical term in the 3GPP standard).

In a case where the first communication node receives measurement reference signal parameter configuration which does not satisfy the restriction condition, the first communication node does not transmit the measurement reference signal.

In a case where the first communication node receives the measurement reference signal parameter configuration which does not satisfy the restriction condition, the first communication node sends predetermined indication information (herein, the predetermined indication information may be sent to a higher layer of the first communication node, or a second communication node, where the second communication node is a peer end transmitting the measurement reference signal).

The first communication node is a communication node transmitting the measurement reference signal.

According to another embodiment of the present disclosure, a device for transmitting an uplink reference signal is further provided. The device includes a third transmission module.

The third transmission module is configured to transmit an uplink reference signal.

In a case where the uplink reference signal uses a time domain OCC, the uplink reference signal satisfies at least one of the following conditions.

A length of a time domain OCC corresponding to the uplink reference signal is less than or equal to a frequency domain repeated sending parameter R corresponding to the uplink reference signal, and the frequency domain repeated sending parameter R is the number of time domain symbols included in a unit of frequency domain hopping of the uplink reference signal.

The length of the time domain OCC corresponding to the uplink reference signal is less than or equal to a sequence repetition parameter R5 of the uplink reference signal.

The length of the time domain OCC has an association with a sequence parameter of the uplink reference signal.

R and R5 are positive integers.

In one embodiment, the association between the length of the time domain OCC and the sequence parameter of the uplink reference signal includes at least one of the following.

In a case where the length of the time domain OCC is greater than 1, sequences corresponding to R1 time domain symbols occupied by one uplink reference signal port in one time unit are the same.

In a case where sequences corresponding to R1 time domain symbols occupied by one uplink reference signal port in one time unit are different, a length of a time domain OCC corresponding to the uplink reference signal port is 1.

R1 at least satisfies one of the following features: R1 is less than or equal to R, R1 is the length of the time domain OCC, or R1 is less than or equal to N, where N is the number of time domain symbols occupied by the one uplink reference signal port in one time unit.

In an embodiment, the at least one module described above may be implemented by software or hardware. Implementation by the hardware may, but may not necessarily, be performed in the following manner: the at least one module described above is located in the same processor or located in their respective processors in any combination form.

EMBODIMENT THREE

According to another embodiment of the present disclosure, a storage medium is further provided. The storage medium is configured to store computer programs, where the computer programs, when executed, execute the method described in any embodiment of the present disclosure.

In this embodiment, the storage medium may include, but is not limited to, a universal serial bus flash disk, a ROM, a RAM, a mobile hard disk, a magnetic disk, an optical disk or another medium capable of storing program codes.

EMBODIMENT FOUR

According to another embodiment of the present disclosure, an electronic device is further provided. The electronic device includes a memory and a processor. The memory is configured to store computer programs, and the processor is configured to run the computer programs for executing the method described in any embodiment of the present disclosure.

In one embodiment, the electronic device described above may further include a transmission device and an input/output device, where both the transmission device and the input/output device are connected to the processor described above.

In one embodiment, for examples in this embodiment, reference may be made to the examples described in the embodiments and optional embodiments described above, and repetition will not be made in this embodiment.

In one embodiment, for examples in this embodiment, reference may be made to the examples described in the embodiments and optional embodiments described above, and repetition will not be made in this embodiment.

In the present application, the symbol is a modulation symbol, or a reference signal symbol, or a symbol before being multiplied by the time domain OCC.

Those skilled in the art should understand that various modules or steps described above of the present disclosure may be implemented by a general-purpose computing apparatus, the various modules or steps may be concentrated on a single computing apparatus or distributed on a network composed of multiple computing apparatuses. In an embodiment, the various modules or steps may be implemented by program codes executable by the computing apparatus, so that the modules or steps may be stored in a storage apparatus for execution by the computing apparatus, and in some circumstances, the illustrated or described steps may be performed in sequences different from those described herein, or the modules or steps may be made into various integrated circuit modules separately, or multiple modules or steps therein may be made into a single integrated circuit module for implementation. The present disclosure is not limited to any specific combination of hardware and software.

What is claimed is:

1. A method for wireless communication, comprising:
   generating, by a base station, a sequence of a sounding reference signal using a cyclic shift parameter, wherein the cyclic shift parameter is based on $$n_{SRS}^{cs,i} = \left(n_{SRS}^{cs} + \frac{n_{SRS}^{cs,max} p_i}{N_{ap}^{SRS}}\right) \bmod n_{SRS}^{cs,max},$$

wherein i=0, 1, . . . , $N_{ap}^{SRS}-1$, $N_{ap}^{SRS}$ is a number of sounding reference signal ports included in a SRS resource, $n_{SRS}^{cs} \in \{0, 1, \ldots n_{SRS}^{cs,max}-1\}$, $n_{SRS}^{cs,max}$ represents a predetermined value associated with the sounding reference signal, and $p_i$ represents an antenna port, and wherein the cyclic shift parameter is further based on a function of a time-domain symbol position in which the sounding reference signal is located, a frame number of a frame in which the sounding reference signal is located, a time unit number for a subcarrier spacing configuration and a number of time units in the frame in which the sounding reference signal is located; and transmitting the sounding reference signal to a terminal device using the generated sequence.

2. The method of claim 1, wherein the cyclic shift parameter hops every F time domain symbols, F being a positive integer, wherein the F time domain symbols includes the sounding reference signal ports included in a SRS resource.

3. The method of claim 1, wherein the function is based on c(g(X)), wherein c represents a random sequence, and wherein g(X) is a function based on:

$$l_2 + n_s * N + B * n'_f * N$$

wherein $l_2$ represents a time-domain symbol index of a symbol in which the sounding reference signal is located, $n_s$ represents the time unit number for the subcarrier spacing configuration, N represents a number of symbols in a time unit in which the sounding reference signal is located, $n_f$ represents the frame number, where $n'_f = n_f \bmod(E)$, E being a predetermined value, and B represents the number of time units in the frame in which the sounding reference signal is located.

4. The method of claim 3, wherein the random sequence is generated by an initial value using an identity configured by a higher layer.

5. A method for wireless communication, comprising:
   receiving, by a user equipment, a sounding reference signal from a base station,
   wherein a sequence of the sounding reference signal is generated using a cyclic shift parameter,
   wherein the cyclic shift parameter is based on $$n_{SRS}^{cs,i} = \left(n_{SRS}^{cs} + \frac{n_{SRS}^{cs,max} p_i}{N_{ap}^{SRS}}\right) \bmod n_{SRS}^{cs,max},$$

wherein i=0, 1, . . . , $N_{ap}^{SRS}-1$, $N_{ap}^{SRS}$ is a number of measurement reference signal ports included in a SRS resource, $n_{SRS}^{cs} \in \{0, 1, \ldots n_{SRS}^{cs,max}-1\}$, $n_{SRS}^{cs,max}$ represents a predetermined value associated with the sounding reference signal, and $p_i$ represents an antenna port, and wherein the cyclic shift parameter is further based on a function of a time-domain symbol position in which the sounding reference signal is located, a frame number of a frame in which the sounding reference signal is located, and a time unit number for a subcarrier spacing configuration; and performing, by the user equipment, a measurement using the sounding reference signal.

6. The method of claim 5, wherein the cyclic shift parameter hops every F time domain symbols, F being a positive integer.

7. The method of claim 5, wherein the function is based on c(g(X)), wherein c represents a random sequence, and wherein g(X) is a function based on:

$$l_2+n_s*N+B*n'_f*N$$

wherein $l_2$ represents a time-domain symbol index of a symbol in which the sounding reference signal is located, $n_s$ represents the time unit number for the subcarrier spacing configuration, N represents a number of symbols in a time unit in which the sounding reference signal is located, $n_f$ represents the frame number, where $n'_f=n_f \bmod(E)$, E being a predetermined value, and B represents a number of time units in the frame in which the sounding reference signal is located.

8. The method of claim 7, wherein the random sequence is generated by an initial value using an identity configured by a higher layer.

9. A device for wireless communication, comprising at least one processor configured to:
generate a sequence of a sounding reference signal using a cyclic shift parameter,
wherein the cyclic shift parameter is based on $$n_{SRS}^{cs,i} = \left(n_{SRS}^{cs} + \frac{n_{SRS}^{cs,max} p_i}{N_{ap}^{SRS}}\right) \bmod n_{SRS}^{cs,max},$$

wherein i=0, 1, ..., $N_{ap}^{SBS}-1$, $N_{ap}^{SRS}$ is a number of sounding reference signal ports included in a SRS resource, $n_{SRS}^{cs} \in \{0, 1, \ldots n_{SRS}^{cs,max}-1\}$, $n_{SRS}^{cs,max}$ represents a predetermined value associated with the sounding reference signal, and $p_i$ represents an antenna port, and
wherein the cyclic shift parameter is further based on a function of a time-domain symbol position in which the sounding reference signal is located, a frame number of a frame in which the sounding reference signal is located, and a time unit number for a subcarrier spacing configuration; and
transmit the sounding reference signal to a terminal device using the generated sequence.

10. The device of claim 9, wherein the cyclic shift parameter hops every F time domain symbols, F being a positive integer.

11. The device of claim 9, wherein the function is based on c(g(X)), wherein c represents a random sequence, and wherein g(X) is a function based on:

$$l_2+n_s*N+B*n'_f*N$$

wherein $L_2$ represents a time-domain symbol index of a symbol in which the sounding reference signal is located, $n_s$ represents the time unit number for the subcarrier spacing configuration, N represents a number of symbols in a time unit in which the sounding reference signal is located, $n_f$ represents the frame number, where $n'_f=n_f \bmod(E)$, E being a predetermined value, and B represents a number of time units in the frame in which the sounding reference signal is located.

12. The device of claim 11, wherein the random sequence is generated by an initial value using an identity configured by a higher layer.

13. A device for wireless communication, comprising at least one processor configured to:
receive a sounding reference signal from a base station,
wherein a sequence of the sounding reference signal is generated using a cyclic shift parameter,
wherein the cyclic shift parameter is based on $$n_{SRS}^{cs,i} = \left(n_{SRS}^{cs} + \frac{n_{SRS}^{cs,max} p_i}{N_{ap}^{SRS}}\right) \bmod n_{SRS}^{cs,max},$$

wherein i=0, 1, ..., $N_{ap}^{SRS}-1$, $N_{ap}^{SRS}$ is a number of sounding reference signal ports included in a SRS resource, $n_{SRS}^{cs} \in \{0, 1, \ldots n_{SRS}^{cs,max}-1\}$, $n_{SRS}^{cs,max}$ represents a predetermined value associated with the sounding reference signal, and $p_i$ represents an antenna port, and
wherein the cyclic shift parameter is further based on a function of a time-domain symbol position in which the sounding reference signal is located, a frame number of a frame in which the sounding reference signal is located, and a time unit number for a subcarrier spacing configuration; and
perform a measurement using the sounding reference signal.

14. The device of claim 13, wherein the cyclic shift parameter hops every F time domain symbols, F being a positive integer.

15. The device of claim 13, wherein the function is based on c(g(X)), wherein c represents a random sequence, and wherein g(X) is a function based on:

$$l_2+n_s*N+B*n'_f*N$$

wherein $l_2$ represents a time-domain symbol index of a symbol in which the sounding reference signal is located, $n_s$ represents the time unit number for the subcarrier spacing configuration, N represents a number of symbols in a time unit in which the sounding reference signal is located, $n_f$ represents the frame number, where $n'_f=n_f \bmod(E)$, E being a predetermined value, and B represents a number of time units in the frame in which the sounding reference signal is located.

16. The device of claim 15, wherein the random sequence is generated by an initial value using an identity configured by a higher layer.

* * * * *